US012717092B2

(12) United States Patent
Refai-Ahmed et al.

(10) Patent No.: US 12,717,092 B2
(45) Date of Patent: Aug. 25, 2026

(54) PROTECTION APPARATUS FOR A PHOTONIC DEVICE

(71) Applicant: XILINX, INC., San Jose, CA (US)

(72) Inventors: Gamal Refai-Ahmed, Santa Clara, CA (US); Chuan Xie, Fremont, CA (US); Chi-Yi Chao, New Taipei City (TW); Suresh Ramalingam, Fremont, CA (US); Nagadeven Karunakaran, Butterworth (MY); Ferdinand F. Fernandez, San Jose, CA (US)

(73) Assignee: XILINX, INC., San Jose, CA (US)

( * ) Notice: Subject to any disclaimer, the term of this patent is extended or adjusted under 35 U.S.C. 154(b) by 332 days.

(21) Appl. No.: 18/129,765

(22) Filed: Mar. 31, 2023

(65) Prior Publication Data

US 2024/0329329 A1 Oct. 3, 2024

(51) Int. Cl.
*G02B 6/38* (2006.01)
*G02B 6/42* (2006.01)

(52) U.S. Cl.
CPC .......... *G02B 6/3849* (2013.01); *G02B 6/381* (2013.01); *G02B 6/4295* (2013.01)

(58) Field of Classification Search
CPC ........ G02B 6/38; G02B 6/3849; G02B 6/381; G02B 6/4295
See application file for complete search history.

(56) References Cited

U.S. PATENT DOCUMENTS

| | | | | |
|---|---|---|---|---|
| 10,222,566 | B1 * | 3/2019 | Doerr | G02B 6/4231 |
| 2018/0284357 | A1 * | 10/2018 | Nelson | G02B 6/3866 |
| 2021/0162540 | A1 * | 6/2021 | Houbertz | G03F 7/70416 |
| 2022/0255221 | A1 * | 8/2022 | Palese | H01Q 3/2676 |
| 2023/0204879 | A1 * | 6/2023 | Kim | G02B 6/4214 385/33 |
| 2023/0341630 | A1 * | 10/2023 | Lin | G02B 6/30 |

* cited by examiner

*Primary Examiner* — Tina Wong
(74) *Attorney, Agent, or Firm* — Patterson + Sheridan, LLP

(57) ABSTRACT

A method of fabricating a chip package is provided, and a chip package fabricated using the same are provided. The method includes connecting a photonic die to a substrate of the chip package and attaching a protection apparatus to the substrate. The method also includes attaching a photonic connector to the photonic die. At least a portion of the photonic connector is disposed inside a housing of the protection apparatus. A fabrication process is performed on the chip package while the photonic connector is inside the housing. After processing, the photonic connector is removed from the housing.

18 Claims, 19 Drawing Sheets

300
330
332
336
320
321
352
312
310
342
351
311
327

PROTECTION APPARATUS FOR A PHOTONIC DEVICE

TECHNICAL FIELD

Embodiments of the present invention generally relate to a photonic device having a protection apparatus and methods of using the same.

BACKGROUND

Photonic devices are used to transmit and receive optical signals within an optical communication system. The optical communication system is at least partially embodied in a chip package. The photonic devices may be formed by attaching a photonic assembly, having one or more optical devices (e.g., a fiber array and/or a laser) and photonic dies, to a substrate. During assembly, the fiber optic cable are loose and may be damaged during handling or processing. Additionally, inadvertent movement of the cable may damage the optical connectors.

Therefore, a need exists for methods and apparatus for preventing damage to the fiber optic cable during processing.

SUMMARY

Method for fabricating a chip package, and chip packages fabricated using the same are disclosed herein. In one example, a method of fabricating a chip package is provided that includes connecting a photonic die to a substrate of the chip package and attaching a protection apparatus to the substrate. The method also includes attaching a photonic connector to the photonic die. At least a portion of the photonic connector is disposed inside a housing of the protection apparatus. A fabrication process is performed on the chip package while the photonic connector is inside the housing. After processing, the photonic connector is removed from the housing.

In another example, a method of fabricating an electronic device is provided that includes connecting a photonic die to a substrate; attaching a protection apparatus to the substrate; attaching a photonic connector to the photonic die; disposing at least a portion of the photonic connector inside a housing of the protection apparatus; performing a fabrication process with the photonic connector disposed at least partially inside the housing; and removing the photonic connector from the housing after completion of the fabrication process. The substrate may be a package substrate or a printed circuit board.

In still another example, an electronic assembly is provided that includes chip package. The chip package includes a substrate; a photonic die and a photonic connector. The photonic die is mounted to the substrate, while the photonic connector is attached a first side of the photonic die. Protective housing mounts are disposed on the substrate on opposite sides of the photonic connector. The protective housing mounts are configured to receive a protective housing for enclosing at least a portion of the photonic connector.

In yet another example, an electronic assembly includes a chip package and a protection apparatus. The chip package includes a photonic die disposed on a substrate and a photonic connector attached to the photonic die. The protection apparatus includes a housing having a cavity and a plurality of support posts are attachable to the substrate. The housing is coupled to the support posts and at least a portion of the photonic connector is disposed in the cavity of the housing.

In some examples, a method of fabricating an electronic device is provided. The method includes disposing a photonic device on a printed circuit board and coupling a protection apparatus to the printed circuit board. A photonic connector is attached to the photonic die, and at least a portion of the photonic connector is disposed inside a housing of the protection apparatus. A cover is placed on the housing to protect the photonic connector disposed therein. A fabrication process is performed to attach the photonic device to the printed circuit board. After the process, the photonic connector is removed from the housing

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
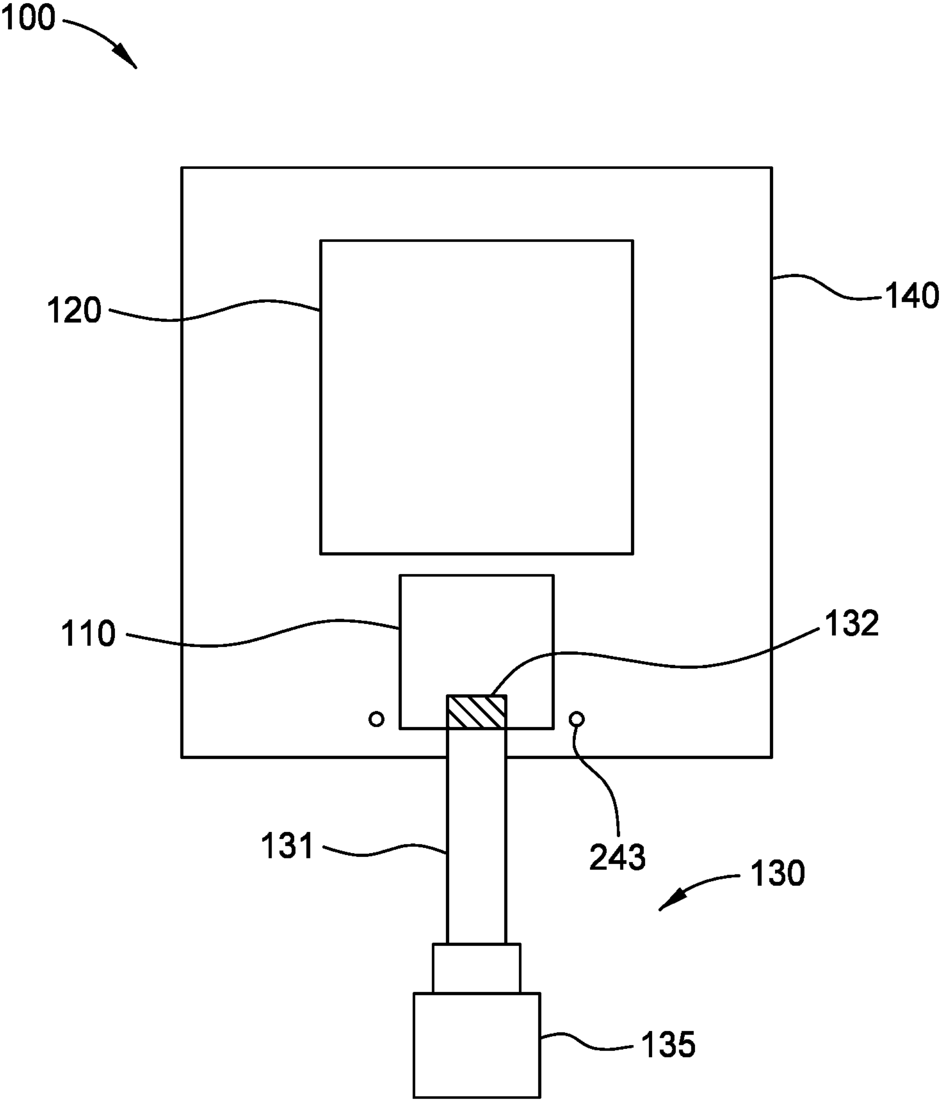
FIG. 1 illustrates a schematic view of a photonic device equipped with a photonic connector, according to some embodiments.

To facilitate understanding, identical reference numerals have been used, where possible, to designate identical elements that are common to the figures. It is contemplated that elements of one embodiment may be beneficially incorporated in other embodiments. Additionally, the adjectives top and bottom are provided for ease of explanation, and may be utilized to desired surfaces that alternatively may have a vertical orientation.

DETAILED DESCRIPTION

A protection apparatus for preventing damage to the fiber optic cable during assembly of a photonic device is provided. The photonic device may be disposed on a substrate of an integrated circuit (IC) device, such as a chip package or a printed circuit board (PCB), and the protection apparatus is attached to the substrate. In some embodiments, the fiber optic cable is disposed in a housing of the protection apparatus during assembly of the IC device. The housing protects the fiber optic cable from damage due to handling or processing, such as during a reflow process. After assembly of the IC device, the fiber optic cable is taken out of the housing, and the housing is removed from the substrate. The housing may be reused to fabricate another IC device.

FIG. 1 illustrates a schematic view of a photonic device 100 equipped with a fiber connector, according to some embodiments. The photonic device 100 may form a part of a chip package or PCB. The photonic device 100 includes a photonic die 110 mounted to a substrate 140, such as a package substrate or a printed circuit board (PCB). The substrate 140 may be an organic substrate, a ceramic substrate, or other suitable substrate. The substrate 140 is configured to receive a protection apparatus. In this example, the substrate 140 includes a plurality of protective housing mounts 243 disposed on opposite sides a photonic connector 130 disposed on one side of the photonic die 110 for connection with the protection apparatus. In the example depicted in FIG. 1, the protective housing mounts 243 are embodied as threaded holes that receive threaded members of a protective housing described further below. An integrated circuit (IC) die 120 is mounted on the substrate 140 and is connected to the photonic die 110 through the substrate 140 or an embedded multi-die interconnect bridge (EMIB). The photonic die 110 is also connected to components external to the photonic device 100 through the photonic connector 130 comprising an optical fiber array 131 and corresponding ferrule 135. The optical fibers comprising the fiber array 131 may be received into the photonics die 110 by a V-groove array 132 or other type of receptacle. In some embodiments, the photonic device 100 may transmit optical signals, receive optical signals, or both. Further, the photonic device 100 may convert optical signals to electrical signals and/or electrical signals to optical signals.

In some embodiments, the photonic die 110 includes a semiconductor substrate having disposed thereon any number of optical elements (e.g., optical modulators, waveguides, amplifiers, and the like). For example, the photonic die 110 may convert optical signals to electrical signals, modulate the optical signals, demodulate optical signals, and/or convert electrical signals to optical signals, among others. In one embodiment, the photonic die 110 includes optical couplers to transmit and/or receive optical signals from the photonic connector 130.

In various embodiments, the IC die 120 processes and/or generates electrical signals. For example, the IC die 120 may process analog and/or digital signals transmitted from the photonic device 100. Additionally, or alternatively, the IC die 120 may process analog and/or digital signals received by the photonic device 100. In one embodiment, the IC die 120 generates control signals for modulating optical signals in the photonic connector 130. Further, the IC die 120 may analyze electrical signals based on received optical signals, communicate electrical signals based on received optical signals to other circuits, and/or provide power to the photonic die 110 for the analysis or conversion of optical signals to or form electrical signals. In various embodiments, the IC die 120 may be omitted and the functions of the IC die 120 may be performed by the photonic die 110.

Figure 2:
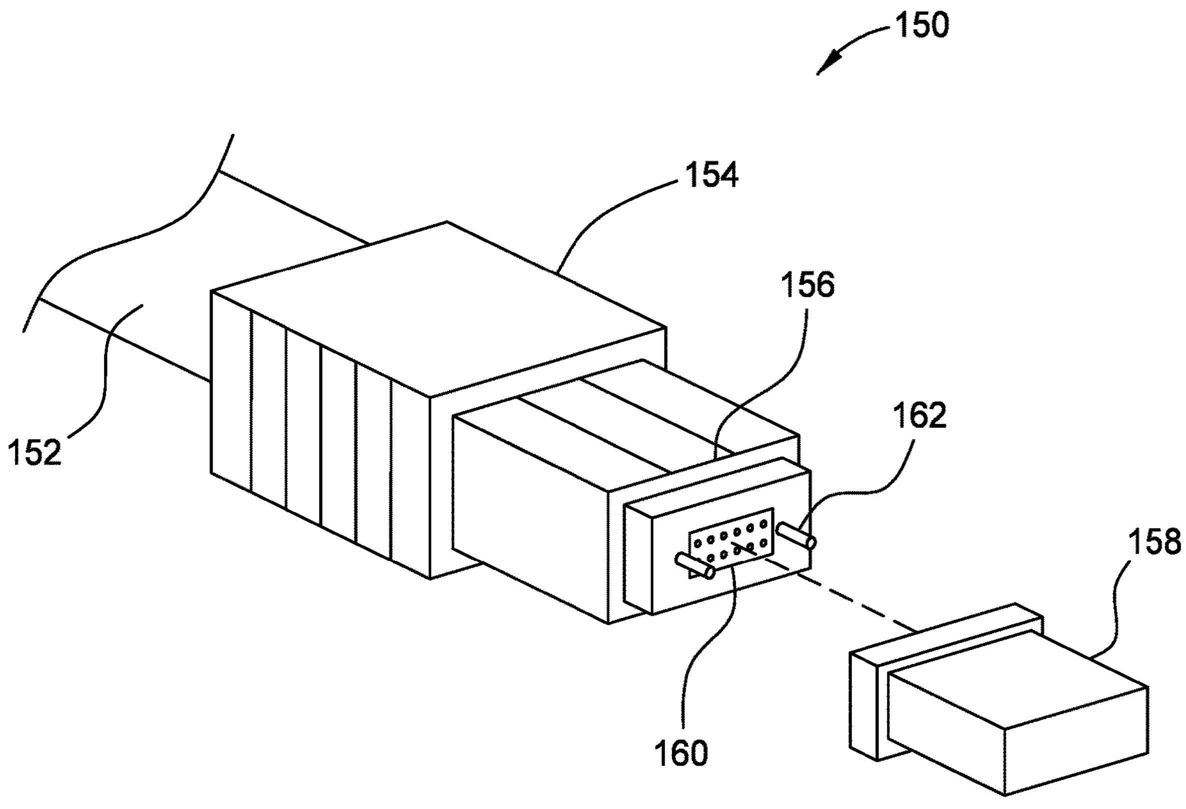
FIG. 2 illustrates an exemplary photonic connector.

FIG. 2 illustrates an exemplary photonic connector 150, which is suitable for use as the photonic connector 130 of FIG. 1. The photonic connector 150 provides a pathway for optical signals to be transmitted to and/or from the photonic device 100. The photonic connector 150 includes a fiber optic cable 152 connected to an adapter 154, and a ferrule 156 attached to the adapter 154 that mates with ferrule 158. Exemplary ferrules include a mechanical transfer (MT) ferrule and a multi-fiber push on (MPO) ferrule. As shown, the ferrules 156 and 158 are MT ferrules, which have a multi-fiber core 160, which may include 12 or 16 pins arranged in two rows of optical fibers. In some embodiments, the optical fibers are arranged in a single dimensional array. Ferrule 156 has two alignment pins 162 protruding from the end of the ferrule 156. Ferrule 158 includes a set of holes to accept the alignment pins 162 from ferrule 156. In some embodiments, ferrule 156 is the female component, and ferrule 158 is the male component. Ferrule 156 is inserted into ferrule 158 during assembly. After ferrule 156 mates with ferrule 158, the optical fibers from both ferrules 156 and 158 are aligned with one another and physically contact. In some embodiments, the photonic connector 150 may have configuration different than that of the exemplary photonic connector 150 depicted in FIG. 2.

Figure 3:
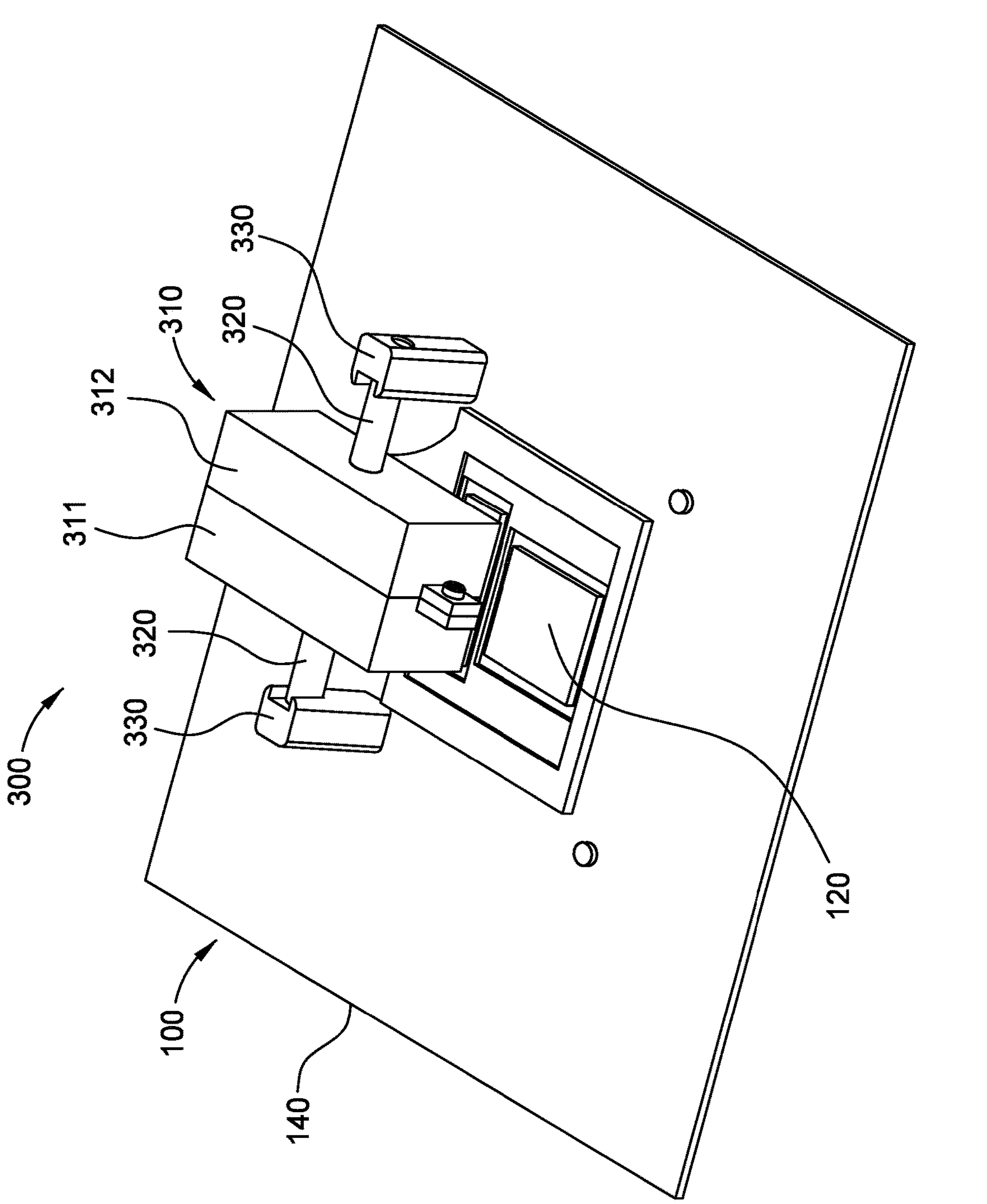
FIG. 3 illustrates a photonic device equipped with a protection apparatus, according some embodiments.
Figure 4:
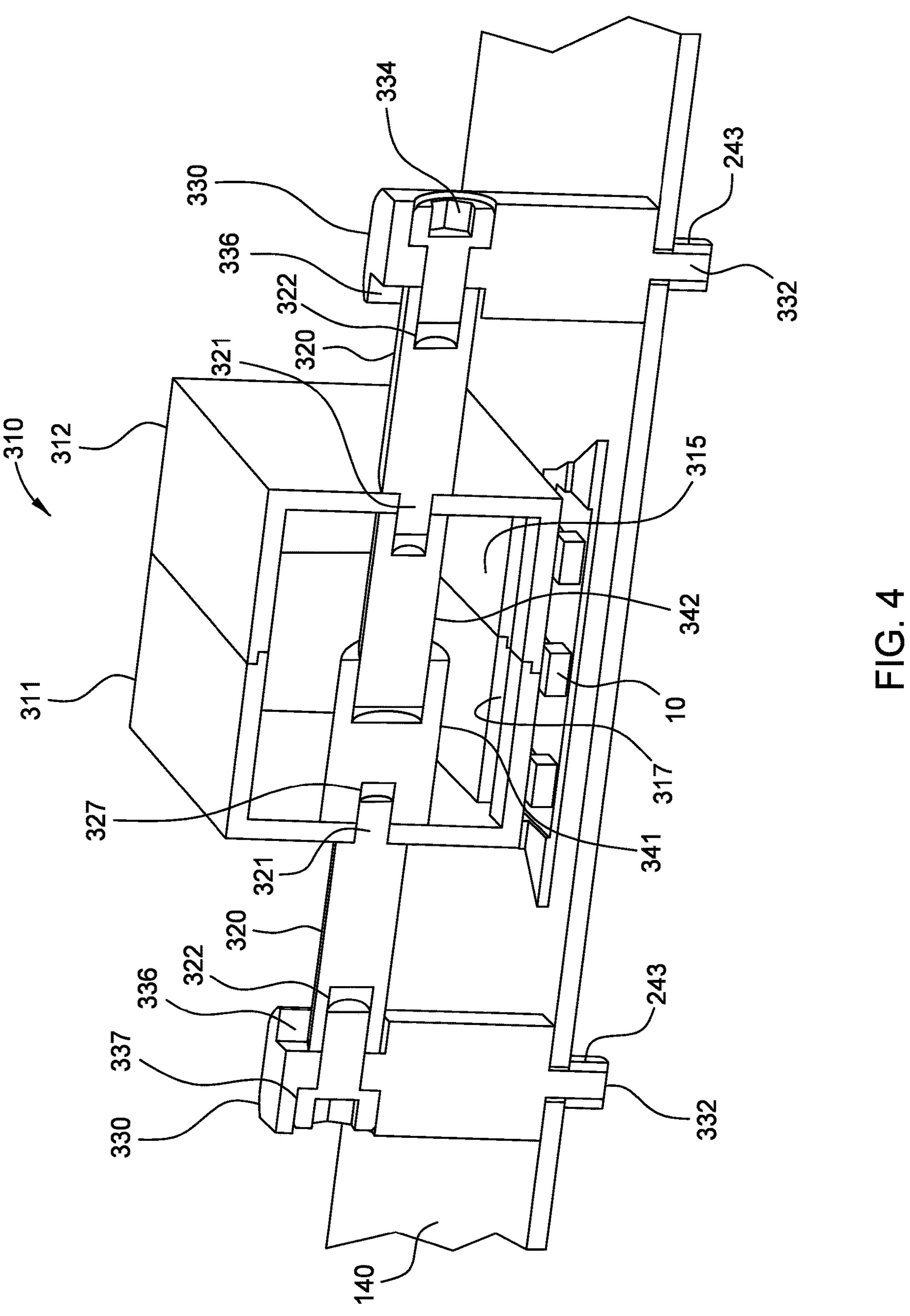
FIG. 4 is a cross-sectional view of the protection apparatus of FIG. 3.
Figure 5:
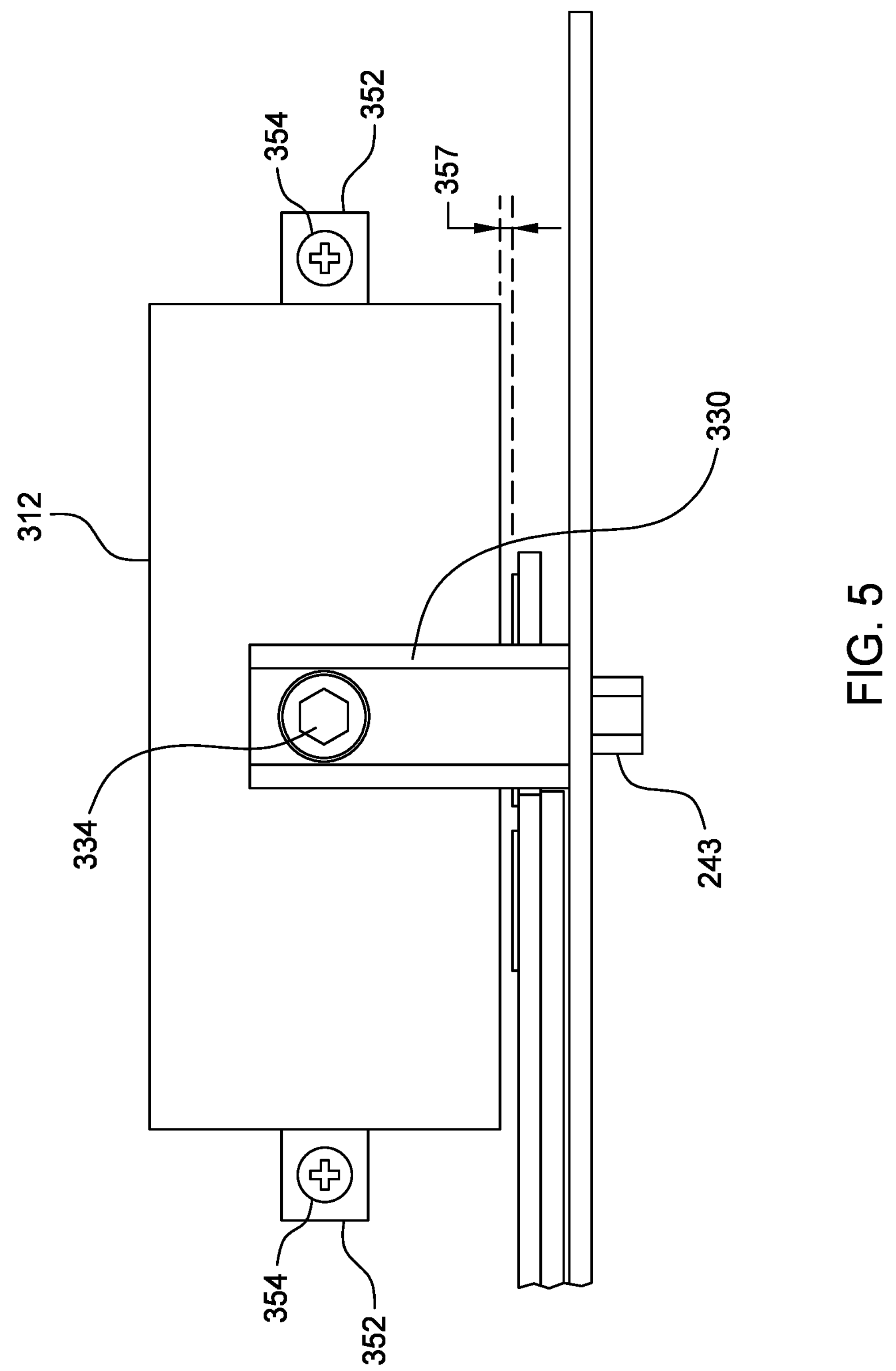
FIG. 5 is a side view of the protection apparatus of FIG. 3.
Figure 6:
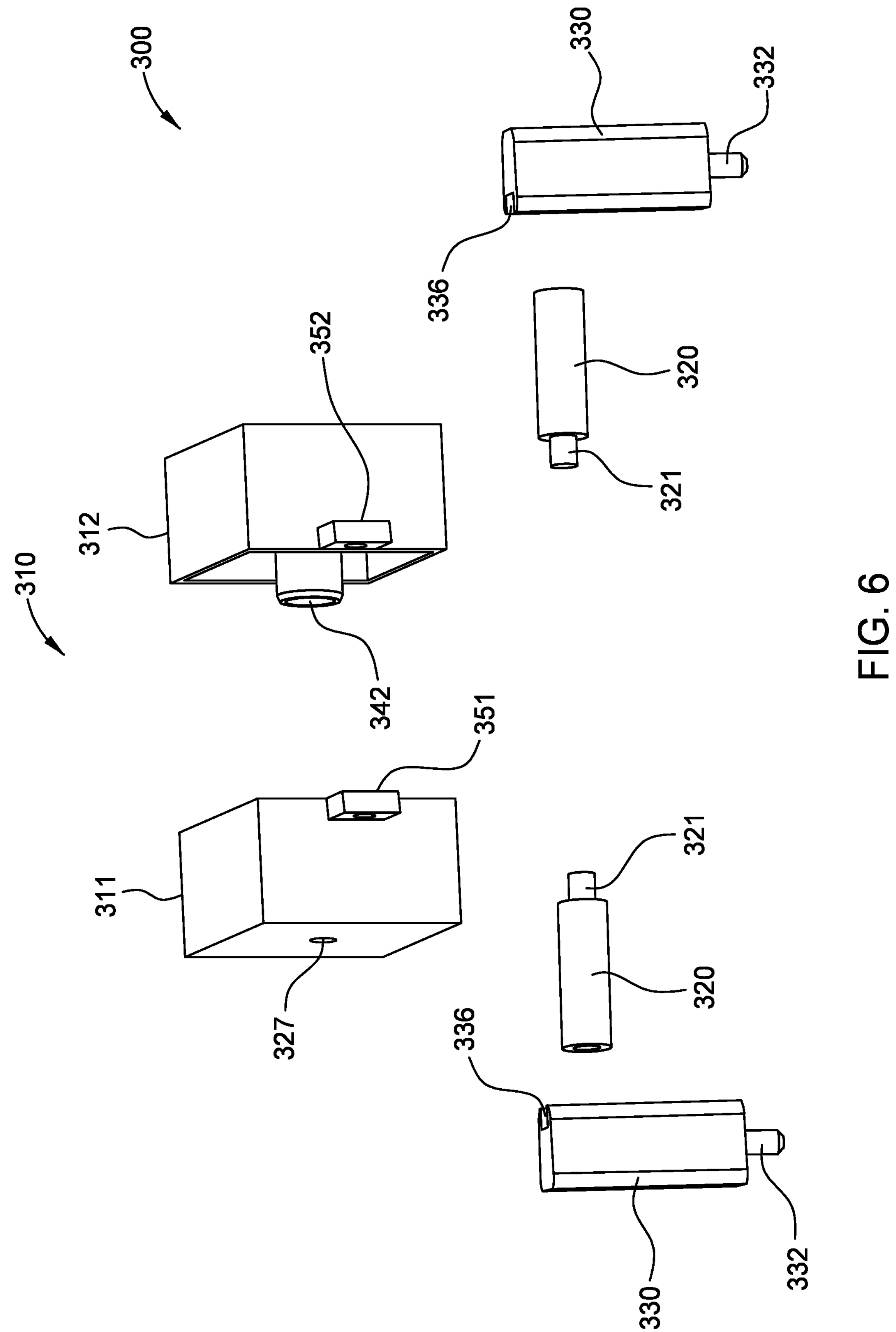
FIG. 6 is an exploded view of the protection apparatus of FIG. 3.

FIG. 3 illustrates the photonic device 100 equipped with a temporary protection apparatus 300 for protecting the photonic connector (e.g., photonic connector 130) during handling or processing, according some embodiments. FIG. 4 is a cross-sectional view of the protection apparatus 300. FIG. 5 is a side view of the protection apparatus 300. FIG. 6 is an exploded view of the protection apparatus 300. As discussed above, the photonic device 100 includes an IC die 120 and a photonic die 110 disposed on a substrate 140 or a PCB. In some embodiments, the substrate 140 is disposed on a PCB. A stiffener 170 is disposed on the substrate 140 and surrounds the IC die 120 and the photonic die 110. The photonic die 110 is located below the housing of protection apparatus 300.

In some embodiments, the protection apparatus 300 includes a housing 310 connected to support posts 330. The housing 310 includes a first housing portion 311 coupled to a second housing portion 312. The first and second housing portions 311, 312 may be separate components, or connected via a hinge. The first and second housing portions 311, 312 when connected, enclose a cavity 315 formed inside the housing 310 that is sized to retain the photonic connector 130. The housing 310 also includes an aperture 317, such as a slot, to allow the photonic connector 130 access into the cavity 315 while connected to the photonic die 110. The aperture 317 may be formed in either of first and second housing portions 311, 312 or partially in both the first and second housing portions 311, 312. In some embodiments, the first and second housing portions 311, 312 are coupled together using a snap fit connection, latches, fasteners, or other suitable technique. For example, the second housing portion 312 includes a male connector 342 extending into the cavity 315 toward the first housing portion 311. The first housing portion 311 includes a receptacle 341 for receiving the male connector 342, whereby the first housing portion 311 is connected to the second housing portion 312. In some embodiments, the snap fit connection is not disposed inside the cavity, but is formed on the exterior of the housing 310. In some embodiments, one or more fasteners are used to couple the first housing portion 311 to the second housing portion 312. For example, the first housing portion 311 includes two flanges 351 located on twos sides of the first housing portion 311 that can be attached to corresponding flanges 352 on the second housing portion 312. Exemplary fasteners 354 such as screws, bolts, snap fit connections, and locking pins can be used to attach the flanges 351, 352 together. It is contemplated the housing 310 may include a single housing portion or more than two housing portions coupled together. In one example, the housing 310 includes a door for accessing the cavity 315. When closed, an aperture is formed between the door and the housing 310 to accommodate the photonic connector 130. In some embodiments, the housing 310 is made from polytetrafluoroethylene (e.g., Teflon™) or other suitable polymer.

The housing 310 is supported on the photonic device 100 using a plurality of support posts 330. The support posts 330 extend in some examples normally from the substrate 140 as part of the protective housing mounts 243. In some embodiments, a pair of support posts 330 includes a fastener for attachment to the substrate 140. For example, the support posts 330 include a threaded section 332 at a lower end for attachment to the substrate 140, and the substrate 140 may include threaded protective housing mounts 243 for receiving the threaded section 332 of the support posts 330. The threaded section 332 may screw into the threaded protective housing mounts 243. The threaded protective housing mounts 243 may be a threaded insert secured to a top or bottom surface of the substrate 140. In other examples, the protective housing mounts 243 may be in the form of a nut, wherein the threaded section 332 passes through a through hole formed in the substrate 140 to engage the nut. The support posts 330 may be secured to the protective housing mounts 243 via other techniques, such a staking, riveting, brazing, soldering, clamping, and clipping, among others. In some embodiments, the support posts 330 are configured to position the housing 310 slightly above the photonic device 100, such that there is a clearance 357 between the bottom of the housing 310 and the photonic device 100.

Figure 7:
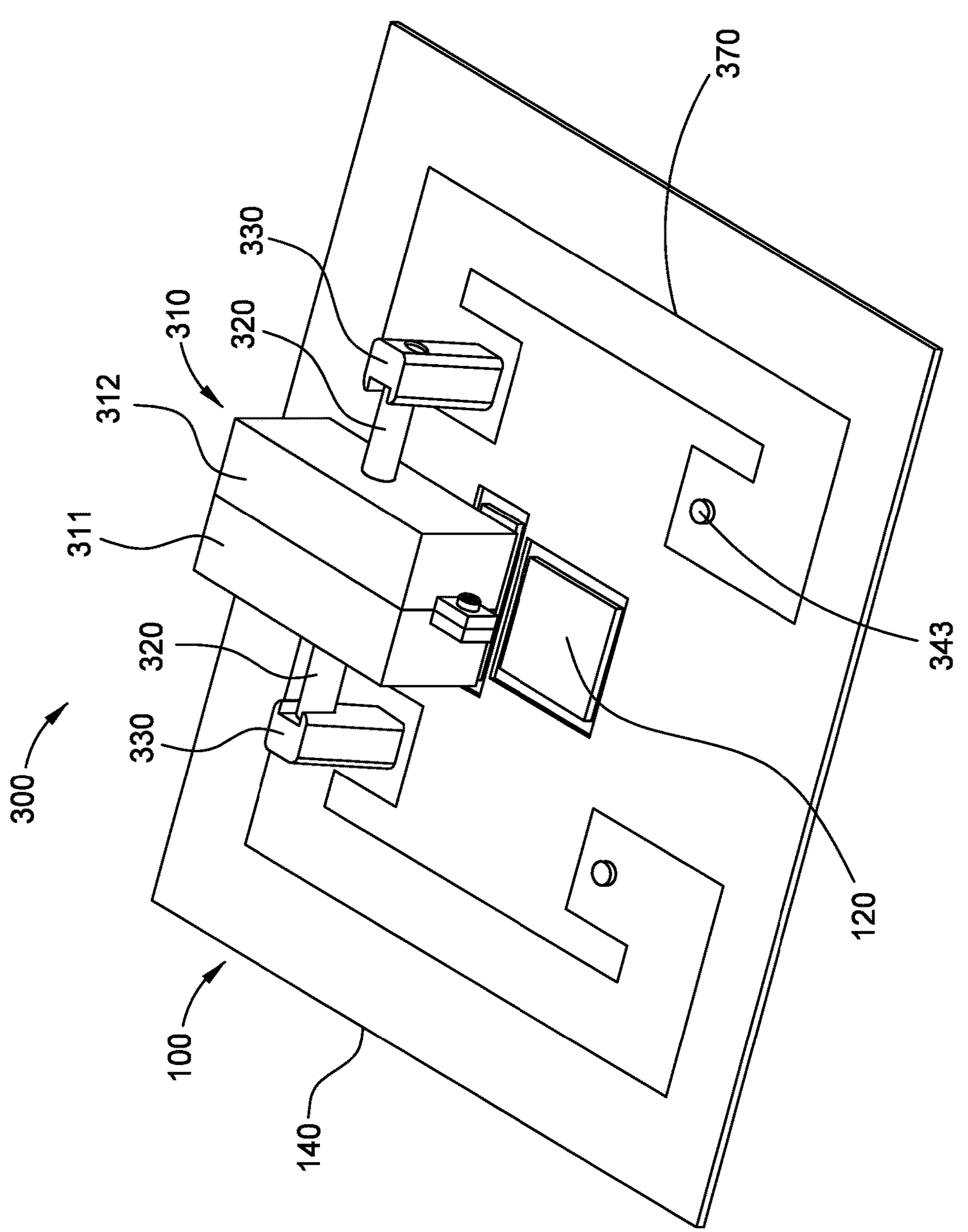
FIG. 7 illustrates another photonic device equipped with a protection apparatus, according some embodiments.
Figure 8:
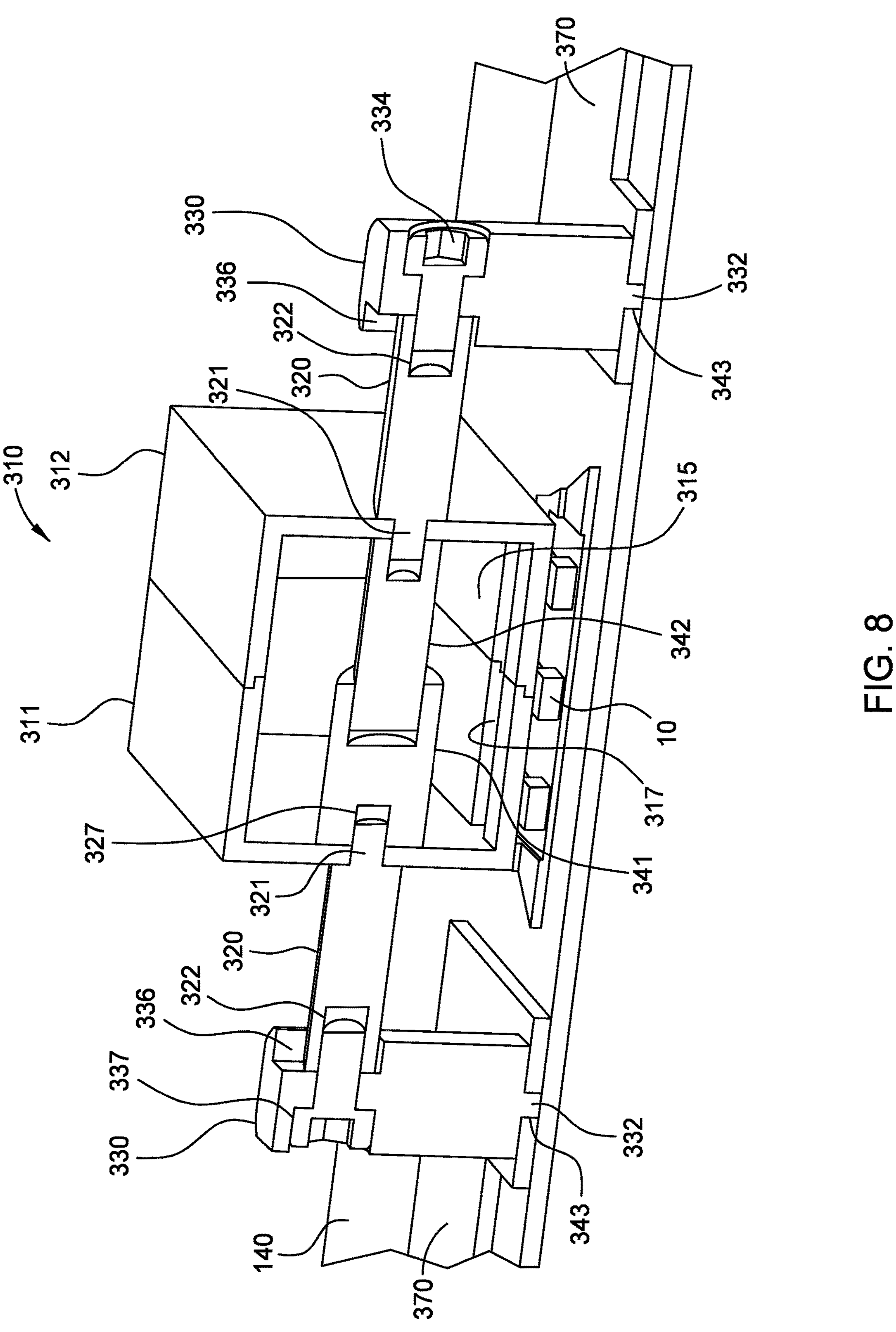
FIG. 8 is a cross-sectional view of the protection apparatus of FIG. 7.

In some embodiments, the protection apparatus 300 is attached to the stiffener 370 via the protective housing mounts 343, as illustrated in FIGS. 7 and 8. In this example, the pair of support posts 330 are attached to the stiffener 370. In some embodiments, the protection apparatus 300 is first attached to the protective housing mounts 243 formed in or one stiffener 370, and thereafter, the stiffener 370 is attached to the substrate 140. In this respect, the protection apparatus 300 can be moved together with the stiffener 370. In some embodiments, the stiffener 370 is attached to the substrate 140 before the protection apparatus 300 is attached to the stiffener 370. In one example, the support posts 330 include a threaded section 332 at a lower end for attachment to the stiffener 370, and the stiffener 370 may include protective housing mounts 343, for example threaded holes, for receiving the threaded section 332. The threaded section 332 may screw into the threaded protective housing mounts 343. In some embodiments, the threaded protective housing mounts 343 may be a threaded insert secured to a top or bottom surface of the stiffener 370. In other examples, the threaded protective housing mounts 343 may be in the form of a nut, wherein the threaded section 332 passes through a through hole formed in the stiffener 370 to engage the nut. It is contemplated more than one protection apparatus 300 may be attached to the stiffener 370, the substrate 140, or a PCB.

In some embodiments, arms 320 are used to couple the support posts 330 to the housing 310. The arms 320 are configured to connect to opposite sides of the housing 310. In one example, each arm 320 includes a pin end 321 that can be inserted into an opening 327 in the housing 310. The opposite end of the arms 320 includes a threaded hole 322 for mating with a threaded connector 334, such as a bolt, of the support posts 330. The threaded connector 334 extends through a countersink bore 337 in the support post 330 and connects with the threaded hole 322 of the arm 320. In some embodiments, an optional channel 336 is formed in the support posts 330 to facilitate the positioning of the arms 320 for connection with the threaded connector 334 of the support posts 330. For example, the channel 336 may guide the end of the arm 320 with the threaded hole 322 into alignment with the threaded connector 334 of the support posts 330 for connection therewith. The arms 320 may be attached to the housing 310 and then inserted into the channel 336 from the top of the support posts 330. In some embodiments, the threaded connector 334 of the support posts 330 have sufficient length to connect directly to the housing 310 such that the arms 320 not used. It is contemplated that the arms 320 may engage the support posts 330 in alternative manners to support the housing 310 above the substrate 140. For example, arms 320 may include plungers or detent balls that engage a hole or depression formed in the sides the support posts 330 such that the housing 310 may be readily connected and removed from the substrate 140 as needed.

Figure 9:
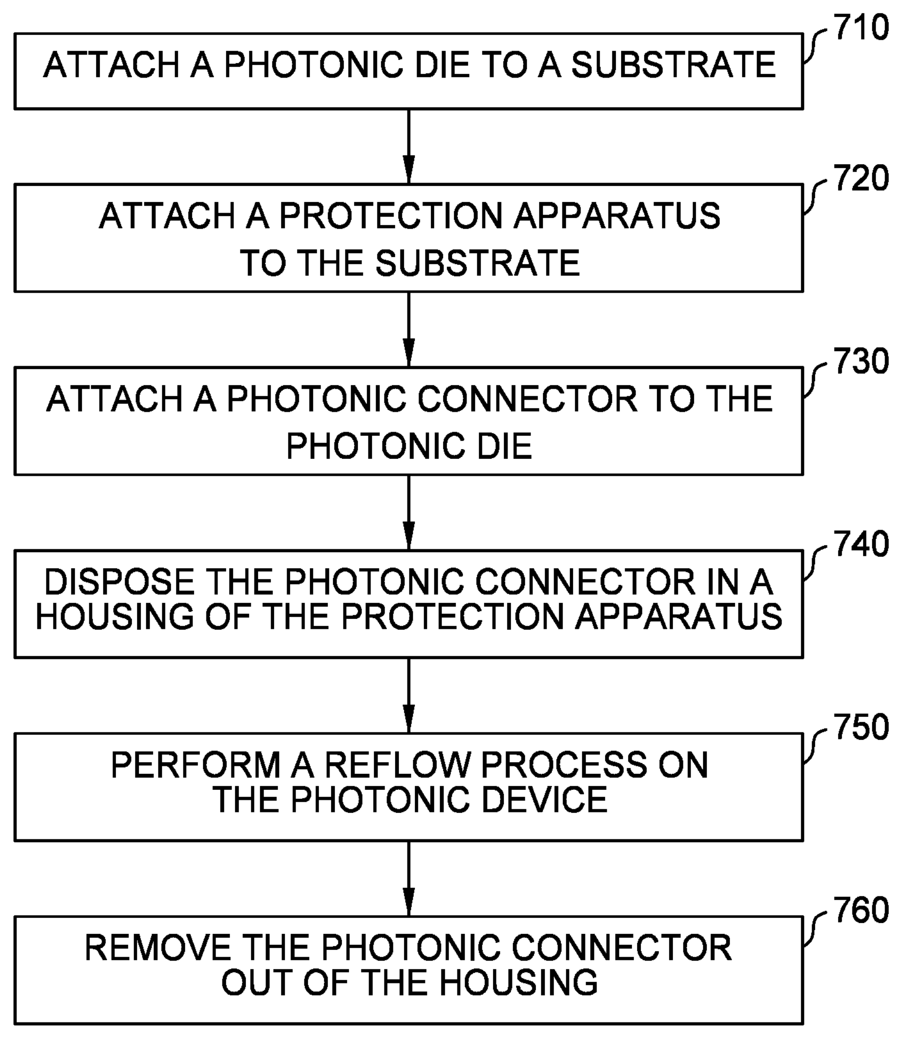
FIG. 9 illustrates a flow diagram of a process for fabricating a chip package having a photonic device, according to some embodiments.

FIG. 9 illustrates a flow diagram of a process for fabricating a chip package having a photonic die 110, according to some embodiments.

At operation 710, a photonic die 110 is attached to a substrate 140. In some embodiments, the photonic die 110 can be attached to a PCB, or the substrate 140 can be attached to a PCB. The photonic die 110 may be soldered to the substrate 140. In some embodiments, one or more components may be attached to the substrate 140 prior to attaching the photonic die 110. For example, an IC die 120 may be attached to the substrate 140 using solder, and then a reflow process is performed to melt the solder and electrically secure the IC die 120 to the substrate 140.

At operation 720, a protection apparatus 300 is attached to substrate 140 via the protective housing mounts 243. For example, the support posts 330 are inserted into preformed protective housing mounts 343 in the stiffener 370. Thereafter, the stiffener 370, along with the protection apparatus 300, is attached to the substrate 140, as shown in FIG. 7. Alternatively, the protection apparatus 300 may be attached to preformed protective housing mounts 243 in the substrate 140, as shown in FIG. 3. It is contemplated operation 720 may be performed prior to operation 710.

At operation 730, a photonic connector 150 is connected to the photonic die 110 on the substrate 140. The photonic connector 150 may be attached using a v-groove array or other suitable receptacle.

At operation 740, the free (distal) end of photonic connector 150 is disposed in the housing 310 of the protection apparatus 300 while the proximal end remains attached to the photonic die 110. Most of the fiber optic cable 152 and the ferrule 156 are disposed inside the housing 310, and a portion of the fiber optic cable 152 near the proximal end extends out of the aperture 317 in the housing 310. In one embodiment, the fiber optic cable 152 has a rolled up configuration inside the housing 310. It is contemplated the free end of the photonic connector 150 may be disposed in the housing 310 prior to operation 720 or operation 730.

At operation 750, a reflow process may be performed to attach the photonic device 100 to the substrate 140. During the reflow process, the fiber optic cable 152 and the ferrule 156 are inside the housing 310 and protected from the higher temperature. Advantageously, use of the housing may result in a higher fabrication yield due to the reduction in damaged fiber optic cables and connectors. In some embodiments, additional components are attached to the substrate 140 using a reflow process while the fiber optic cable 152 remain protected in the housing 310. For example, another IC die can be attached, or the substrate 140 can be attached to a PCB.

At operation 760, after reflow processing, the fiber optic cable 152 and the ferrule 156 are retrieved from the housing 310. The housing 310 is removed from the stiffener 370 or the substrate 140, if the housing 310 is attached to the substrate 140. The housing 310 can be reused for another fabrication process. Additionally, because the protection apparatus is easily attached to the stiffener 370 or the substrate 140 using threads, the cost impact of employing the protection apparatus is minimal.

Figure 10:
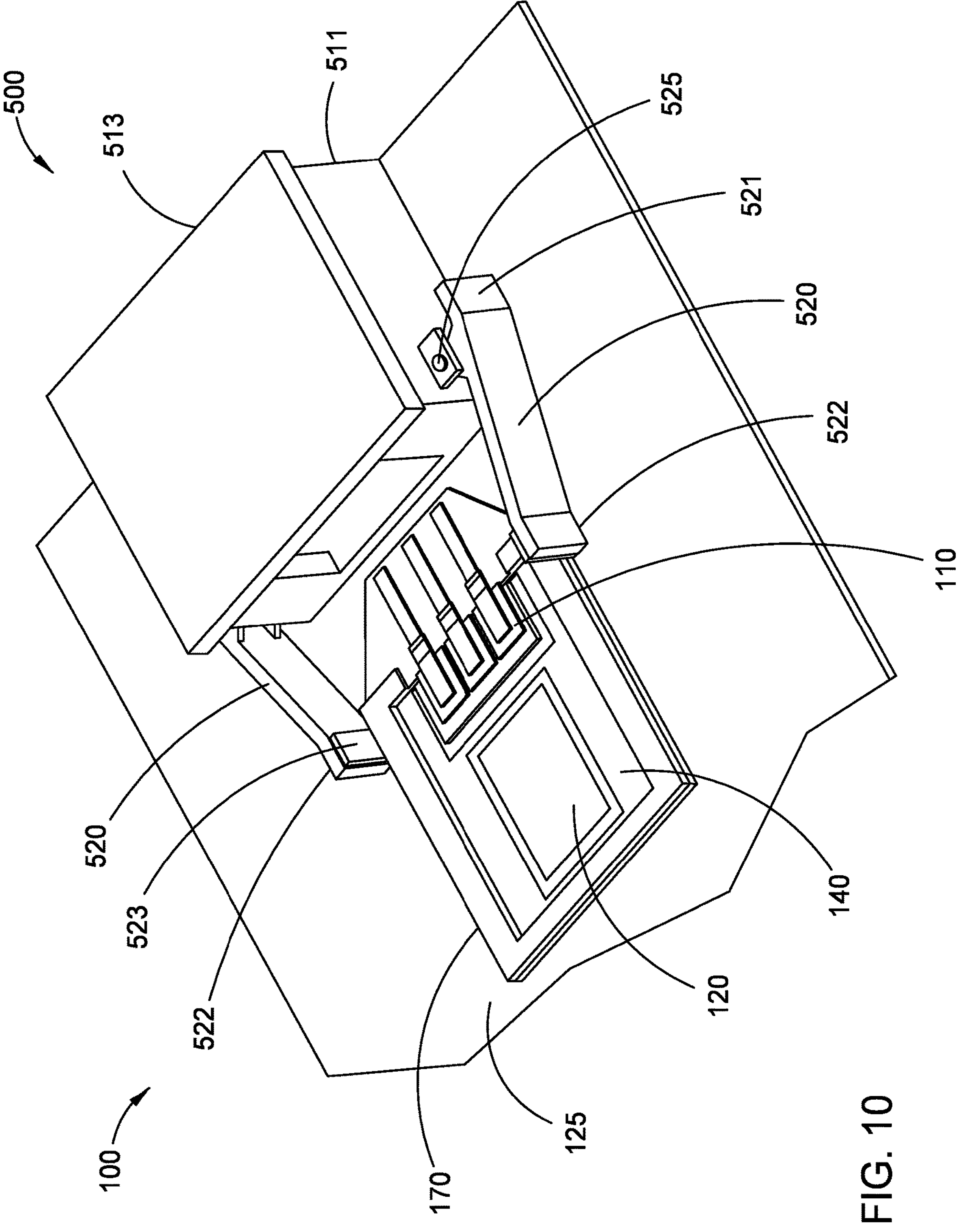
FIG. 10 illustrates a schematic view of another embodiment of a protection apparatus coupled to a photonic device disposed on a printed circuit board.
Figure 11:
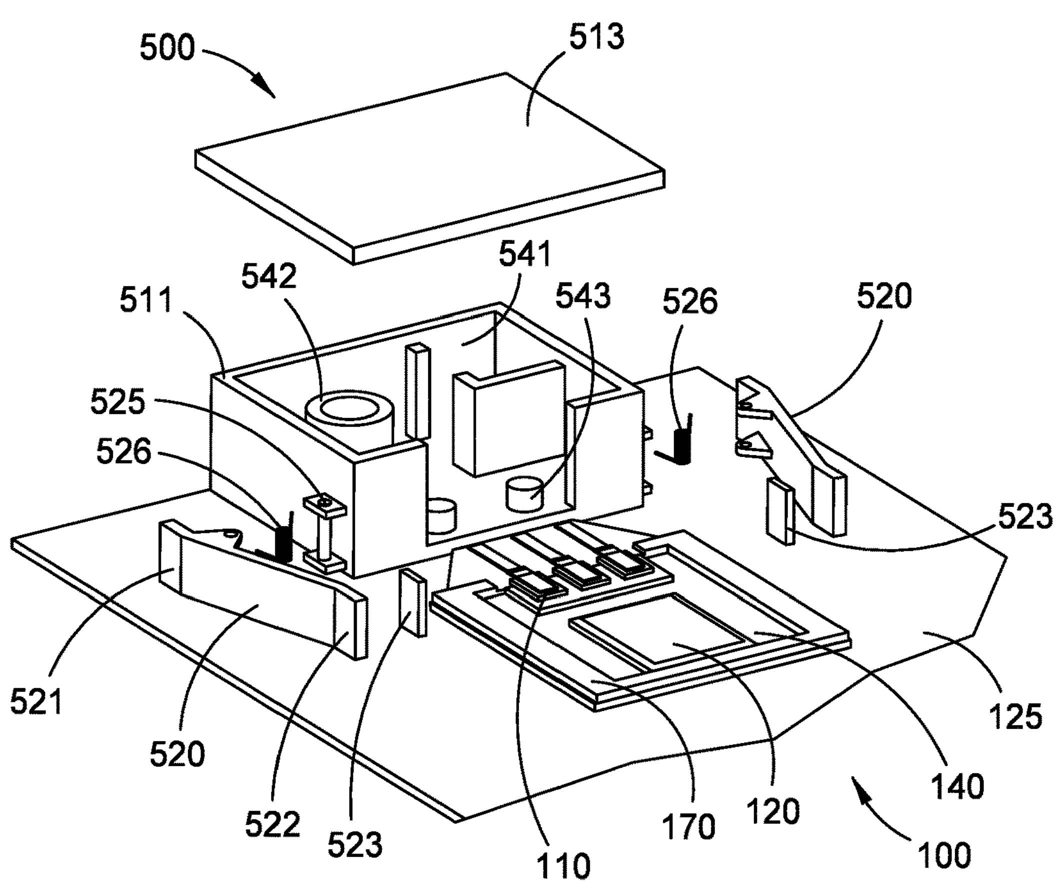
FIG. 11 is an assembly view of the protection apparatus of FIG. 10.
Figure 12:
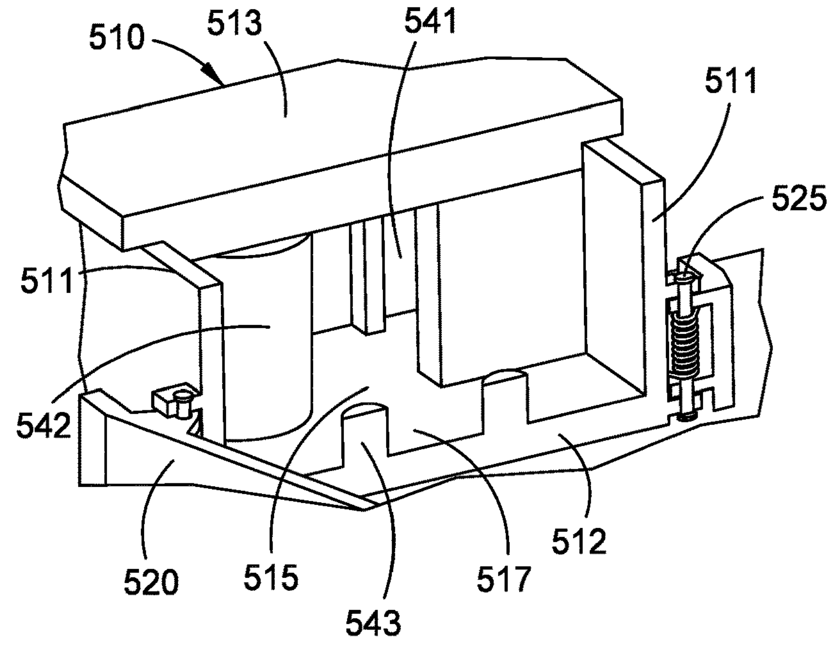
FIG. 12 is partial cut-way view of the protection apparatus of FIG. 10.

FIG. 10 illustrates another embodiment of a protection apparatus 500 for protecting the photonic connector (e.g., photonic connector 150) of the photonic device 100 during handling or processing, according some embodiments. FIG. 11 is an assembly view of the protection apparatus 500. FIG. 12 is partial cut-way view of the protection apparatus 500. As discussed above, the photonic device 100 includes an IC die 120 and a photonic die 110 disposed on a substrate 140 or a PCB 125. In some embodiments, the substrate 140 is disposed on a PCB 125. An optional stiffener 170 is disposed on the substrate 140 and surrounds the IC die 120 and the photonic die 110. The protection apparatus 500 is shown disposed on the PCB 125. In some examples, the protection apparatus 500 is disposed on a support tray located adjacent the PCB 125. In some examples, the protection apparatus 500 is engaged with the photonic device 100 before being disposed on the PCB 125.

In one embodiment, the protection apparatus 500 includes a housing 510 having a plurality of walls 511 attached to a floor 512. The walls 511 define a cavity 515 inside the housing 510 that is sized to retain the photonic connector 150. A cap 513 is disposed on top of the walls 511 to enclose the cavity 515. In some embodiments, one or more fasteners are used to couple the cap 513 to the walls 511. Exemplary fasteners such as screws, bolts, snap fit connections, hinge connections, and locking pins can be used to attach the cap 513 to the walls 511. Although the housing 510 is shown having a rectangular shape, the housing 510 may have any suitable shape for retaining the photonic connector 150. The housing 510 also includes an entry opening 517 to provide the photonic connector 150 access into the cavity 515 while connected to the photonic die 110. An optional chamber 541 is formed inside the housing 510 for receiving the ferrule 156 on the distal (free) end of the photonic connector 150. One or more cable guides 542 for routing the photonic connector 150 in the housing 510 can be disposed inside the housing 510. FIGS. 11 and 12 show a cable guide 542 having a cylindrical shape, although the cable guide 542 may have any suitable cross-sectional shape, such as triangular, rectangular, hexagonal, or other polygonal or non-polygonal shape. In some instances, the photonic connector 150 is wound around the cable guide 542 to manage photonic connectors 150 with a longer length. In some embodiments, optional entry guides 543 are provided to guide the photonic connector 150 into the housing 510. In one embodiment, the housing 510 is made from a metal such as aluminum or a polymeric material. The cap 513 may be made from a non-conductive material such as a rubber or other polymers.

The housing 510 is equipped with a pair of clamping arms 520 for engagement with the photonic device 100. The arms 520 are pivotally connected to the left and right sides of the housing 510. In one example, the arms 520 are connected to the housing 510 using a hinge connection 525. The distal end 522 of the arms 520 extend away from the housing 510 and have sufficient length to engage the photonic device 100. The proximal end 521 extends from the hinge connection 525 in a direction opposite the distal end 522. In some examples, the hinge connection 525 includes a biasing member 526, such as a spring, to bias the arms 520 toward a closed position. The arms 520 can be opened by pressing the proximal end 521 of the arms 520 inward toward the housing 510, which causes the distal end 522 of the arms 520 to pivot outward to the open position. The distal end 522 of the arms 520 are used to grip the package substrate 140 or other suitable parts of the photonic device 100. Optional gripping pads 523 may be provided on the arms 520 to enhance the grip of the arms 520 on the package substrate 140. The gripping pads 523 may be made from a rubber material.

Figure 13:
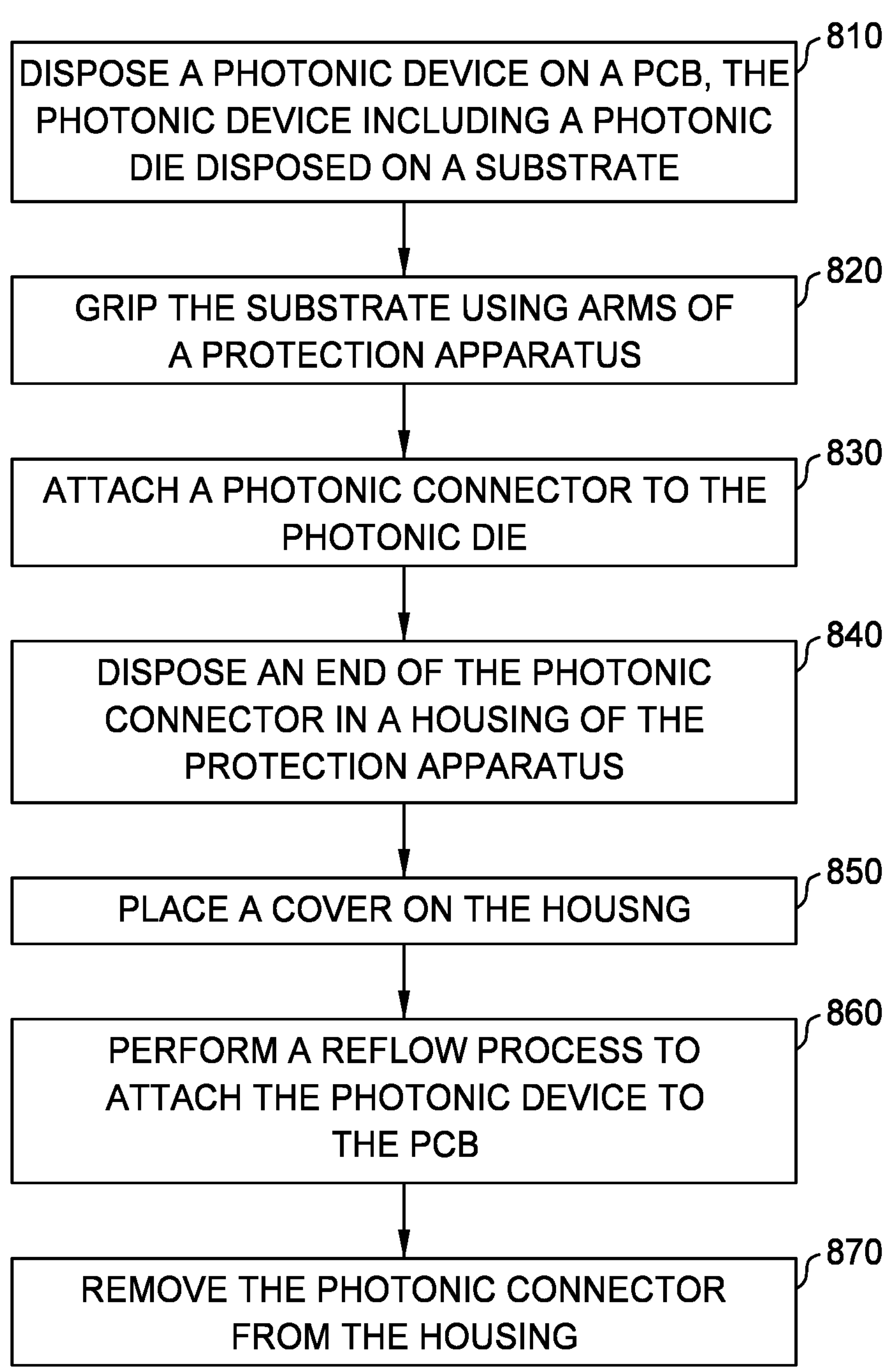
FIG. 13 illustrates a flow diagram of another exemplary process for fabricating an electronic device having a photonic die.

FIG. 13 illustrates a flow diagram of another exemplary process for fabricating an electronic device having a photonic die 110, according to some embodiments.

At operation 810, a photonic device 100 is disposed on a PCB 125. The photonic device 100 includes a photonic die 110 and an IC die 120 attached to a substrate 140. The photonic die 110 may be soldered to the substrate 140. In some embodiments, one or more components may be attached to the substrate 140 prior to attaching the photonic die 110. For example, an IC die 120 may be attached to the substrate 140 using solder, and then a reflow process is performed to melt the solder and electrically secure the IC die 120 to the substrate 140.

Figure 14:
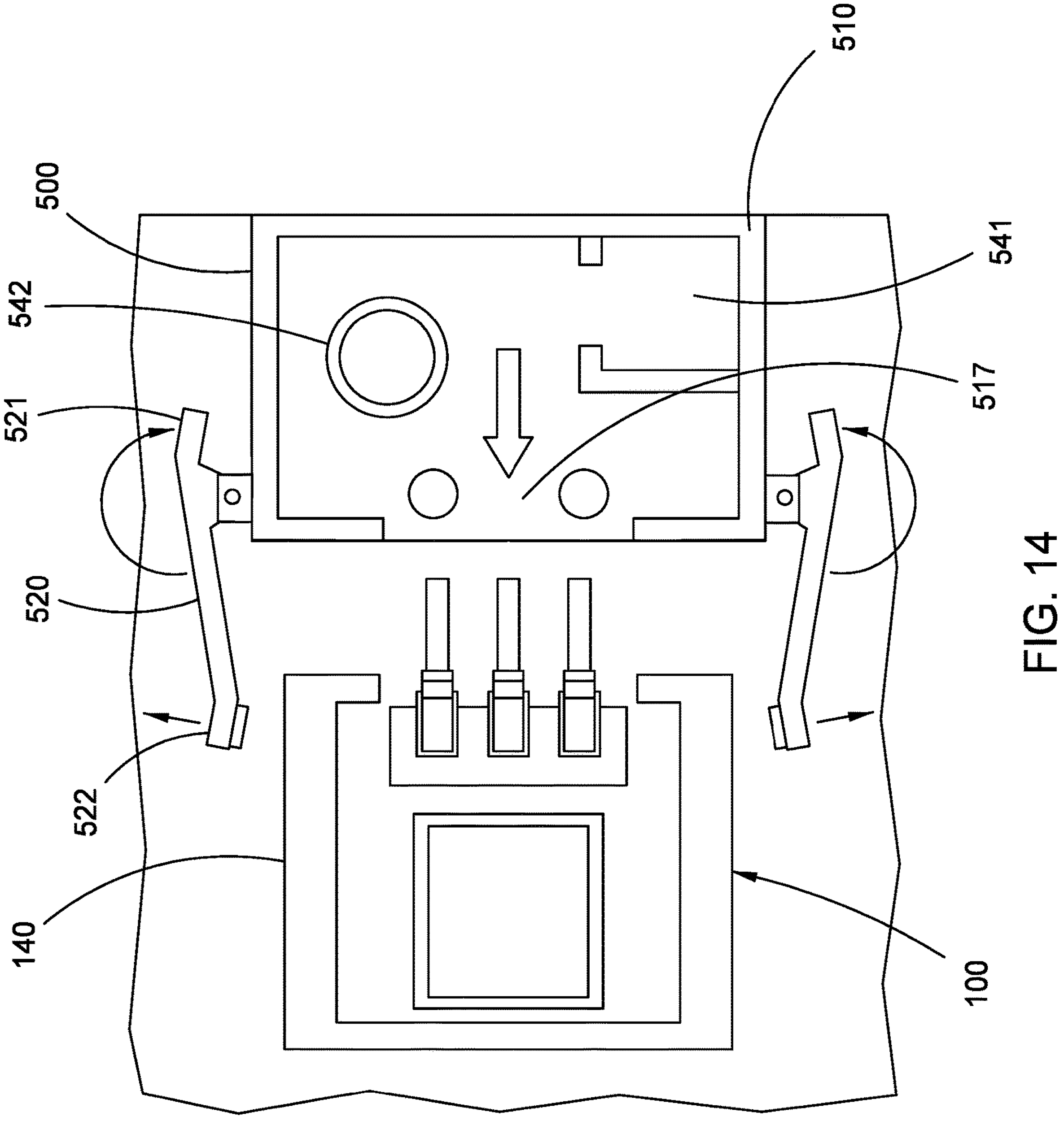
FIG. 14 illustrates a schematic view of the protection apparatus of FIG. 10 with the arms ready to grip the photonic device.
Figure 15:
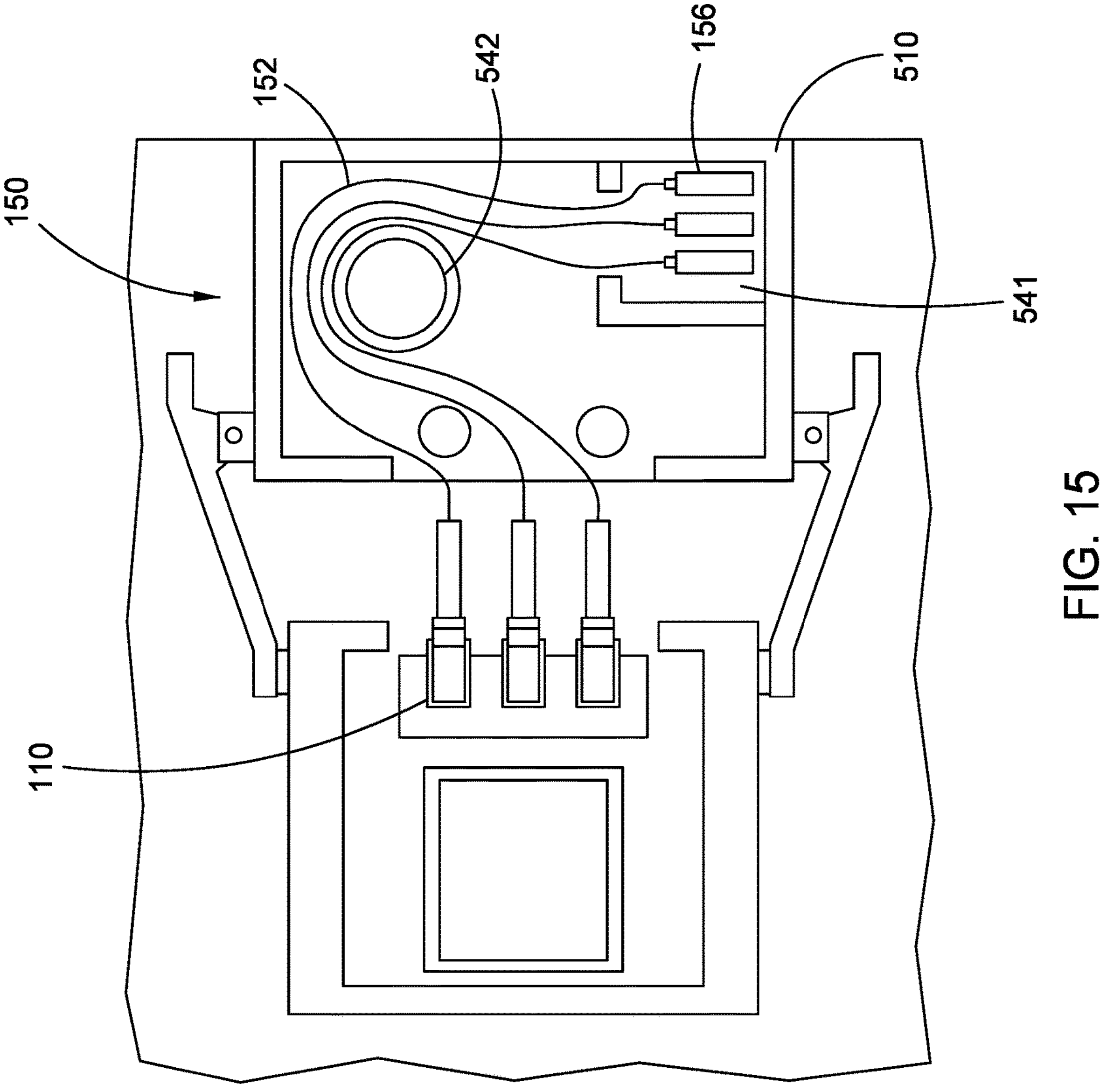
FIG. 15 illustrates a schematic view of the protection apparatus of FIG. 10 gripping the photonic device, and a photonic connector disposed in a housing of the protection apparatus.

At operation 820, a protection apparatus 500 is coupled to the PCB 125. For example, the protection apparatus 500 is positioned on the PCB 125 to grip the photonic device 100, as shown in FIG. 14. The arms 520 can be opened by pressing on the proximal end 521 of the arms 520, thereby pivoting the distal ends 522 of the arms 520 outward to receive the photonic device 100. In this example, the protection apparatus 500 is moved toward the photonic device 100 with the arms 520 in the open position. The arms 520 grip the package substrate 140 when the proximal ends 521 are released. The biasing member 526 helps maintain the distal ends 522 in the closed position against the substrate 140, as shown in FIG. 15.

At operation 830, a photonic connector 150 is connected to the photonic die 110 on the substrate 140. The photonic connector 150 may be attached using a v-groove array or other suitable receptacle.

At operation 840, the free (distal) end of photonic connector 150 is disposed in the housing 510 of the protection apparatus 500 while the proximal end remains attached to the photonic die 110. In one example, the fiber optic cable 152 is routed around the cable guide 542, and the ferrule 156 at the distal end of the photonic connector 150 is disposed inside the chamber 541. Optionally, a length of the fiber optic cable 152 is wound around the cable guide 542. It is contemplated the free end of the photonic connector 150 may be disposed in the housing 510 prior to operation 820 or operation 830.

Figure 16:
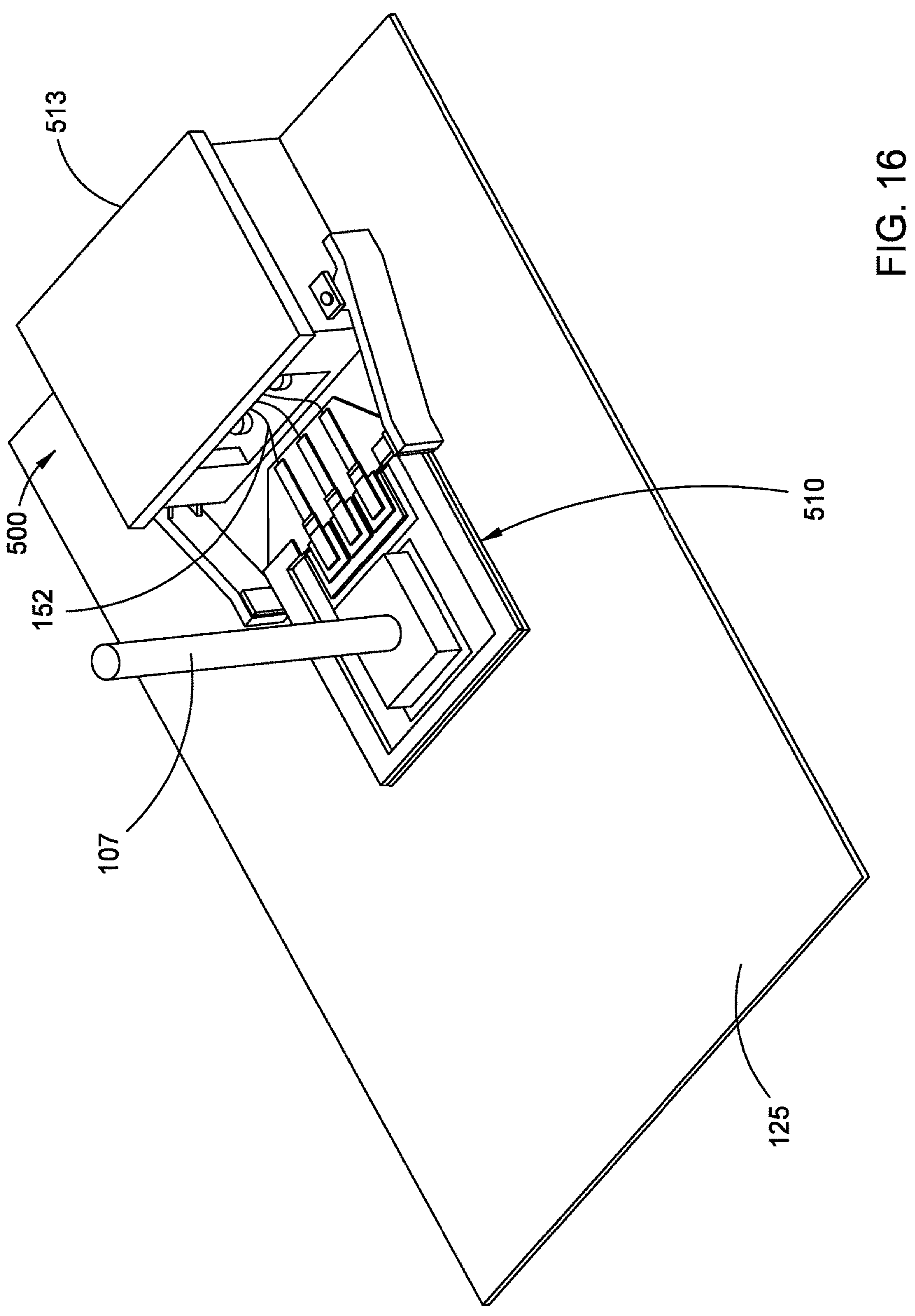
FIG. 16 illustrates a schematic view of the protection apparatus of FIG. 10 with a cover placed on the housing.

At operation 850, a cap 513 is placed on top of the walls 511 of housing 510 to prevent the fiber optic cable 152 from falling out of the housing 510 and to prevent overheating of the fiber optic cable 152 inside the housing 510, as shown in FIG. 16.

At operation 860, a reflow process may be performed to attach the photonic device 100 to the PCB 125. In one example, the photonic device 100, the protection apparatus 500, and the PCB 125 are moved to a reflow chamber to perform the reflow process. For example, a suction tool 107 can be employed to move the photonic device 100, the protection apparatus 500, and the PCB 125 to a reflow processing chamber. During the reflow process, the fiber optic cable 152 and the ferrule 156 are inside the housing 510 and protected from the higher temperature. Advantageously, use of the housing 510 may result in a higher fabrication yield due to the reduction in damaged fiber optic cables and connectors.

At operation 870, after reflow processing, the fiber optic cable 152 and the ferrule 156 of the photonic connector 150 are retrieved from the housing 510. The arms 520 are opened to remove the housing 510 from the substrate 140. The housing 510 can be reused for another fabrication process. Additionally, because the protection apparatus 500 is easily attached to substrate 140 using the arms 520, the cost impact of employing the protection apparatus 500 is minimal.

Figure 17:
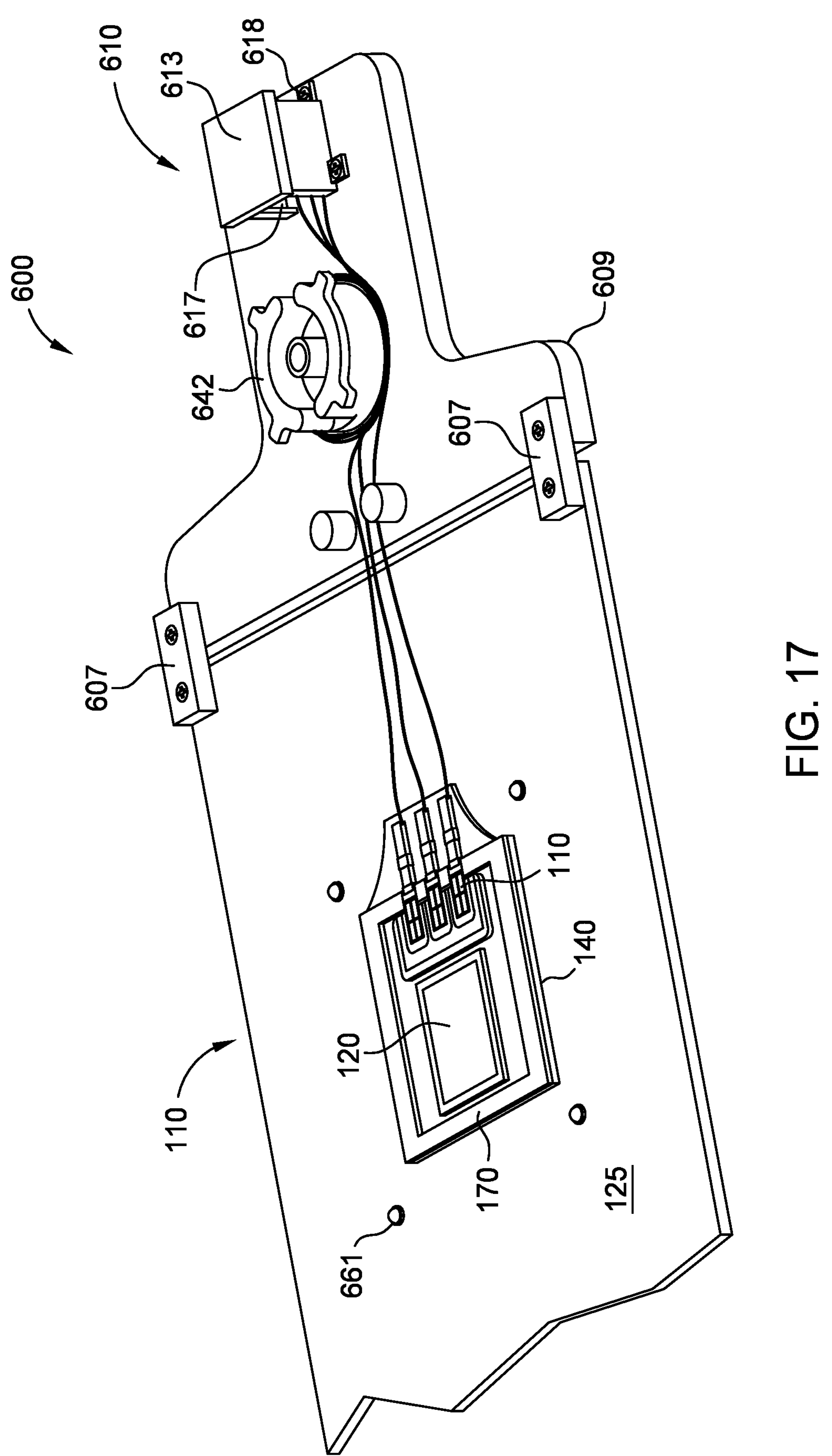
FIG. 17 illustrates a schematic view of another embodiment of a protection apparatus coupled to a photonic device disposed on a printed circuit board.
Figure 18:
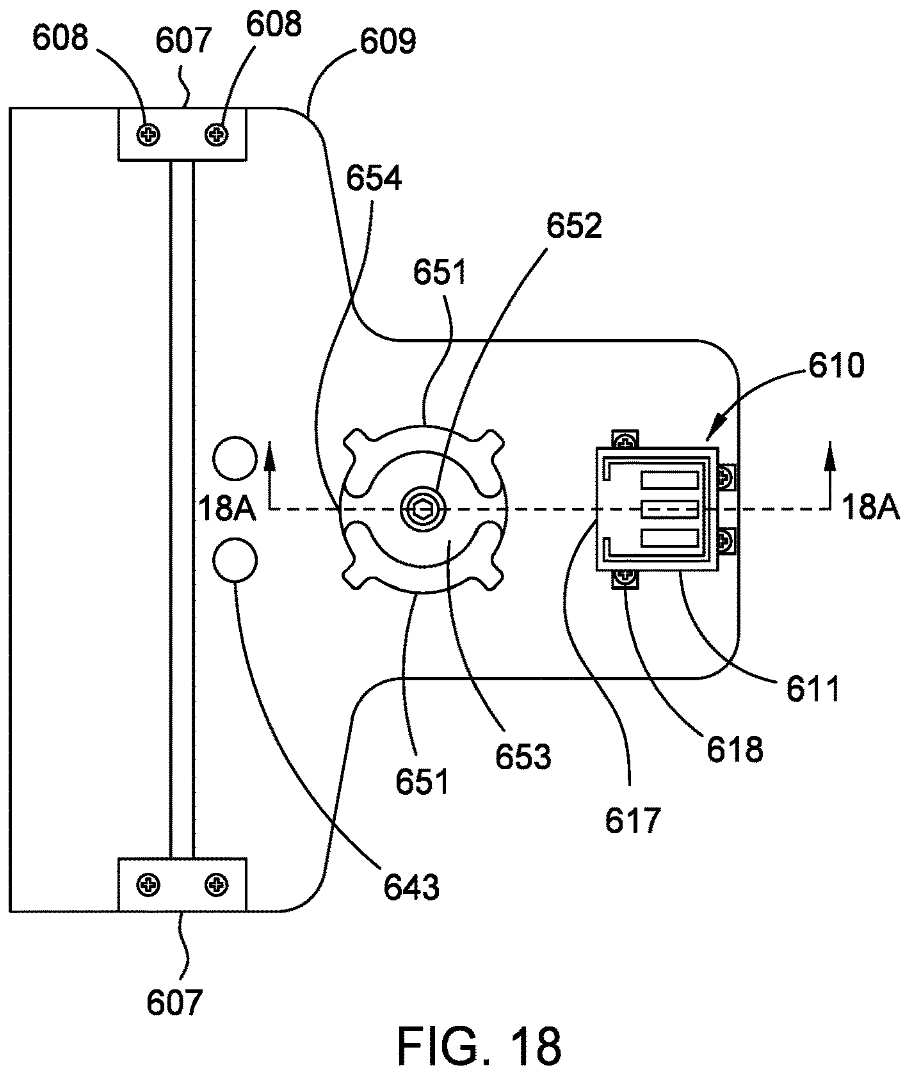
FIG. 18 is a top view of the protection apparatus of FIG. 17.
Figure 18A:
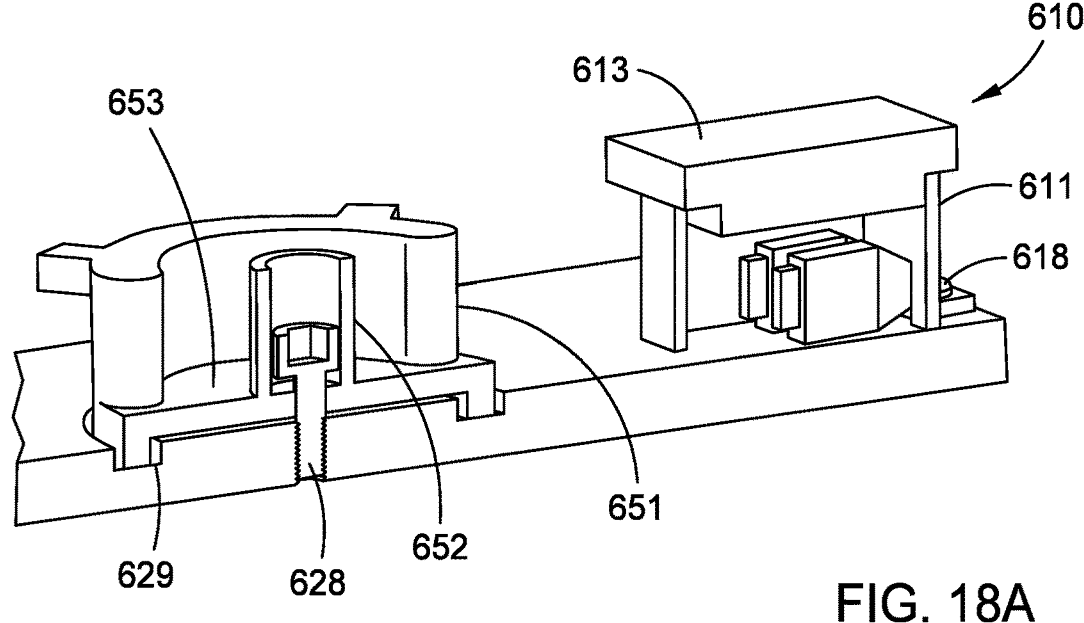
FIG. 18A is partial cross-sectional view of the protection apparatus of FIG. 17.

FIG. 17 illustrates another embodiment of a protection apparatus 600 for protecting the photonic connector (e.g., photonic connector 150) of the photonic device 100 during handling or processing, according some embodiments. FIG. 18 is a top view of the protection apparatus 600. FIG. 18A is partial cross-sectional view of the protection apparatus 600. As discussed above, the photonic device 100 includes an IC die 120 and a photonic die 110 disposed on a substrate 140. The photonic device 100 is disposed on a PCB 125. An optional stiffener 170 is disposed on the substrate 140 and surrounds the IC die 120 and the photonic die 110. The protection apparatus 600 is positioned adjacent to the PCB 125 and attached thereto. In some embodiments, the protection apparatus 600 is disposed on the PCB 125. In some embodiments, a socket is attached to pin holes 661 in the PCB 125.

In one embodiment, the protection apparatus 600 includes a housing 610 disposed on a support tray 609. The support tray 609 is positioned adjacent to an edge of the PCB 125, and the housing 610 is aligned with the photonic die 110. The support tray 609 is attached to the PCB 125 using linkages 607 positioned at the sides of the support tray 609. A first fastener 608 connects the linkage 607 to the PCB, and a second fastener 608 connects the linkage 607 to the support tray 609. Exemplary fasteners 608 include screws, bolts, snap fit connections, and locking pins. In some examples, the linkages 607 are bonded to the PCB 125 and the support tray 609 using an adhesive. The support tray 609 may be made of polymeric material such as silicone rubber. In some examples, the support tray 609 may be made of metal, such as aluminum.

The housing 610 includes a plurality of walls 611 defining a cavity 615 for retaining one or more photonic connectors 150. The housing 610 is attached to the support tray 609 using a plurality of fasteners 618. Exemplary fasteners 618 include screws, bolts, snap fit connections, and locking pins. In some examples, the housing 610 is bonded to the support tray 609 using an adhesive. A cap 613 is disposed on top of the walls 611 to enclose the cavity 615. In some embodiments, one or more fasteners are used to couple the cap 613 to the walls 611. Although the housing 610 is shown having a rectangular shape, the housing 610 may have any suitable shape for retaining the photonic connector 150. The housing 610 also includes an entry opening 617 to provide the photonic connector 150 access into the cavity 615 while connected to the photonic die 110.

A cable guide 642 for routing the photonic connector 150 toward the housing 610 is disposed between the photonic die 110 and the housing 610. The cable guide 642 includes two arcuate walls 651 arranged to form circular shape around a center post 652. The two arcuate walls 651 are spaced apart to define an opening 654 at each end of the walls 651. The openings 654 lead into an annular groove 653 defined between the arcuate walls 651 and the center post 652. Although the cable guide 642 is shown with a cylindrical shape, the cable guide 642 may have any suitable cross-sectional shape, such as triangular, rectangular, hexagonal, or other polygonal or non-polygonal shape. In some instances, the photonic connector 150 is wound around the cable guide 642 to manage photonic connectors 150 with a longer length. The photonic connector 150 may be wound around the center post 652 inside the annular groove 653, wound around the exterior of the arcuate walls 651, or both. The cable guide 642 may be attached to the support tray 609 using any suitable fastener 628, such as a screw or bolt. In one example, the fastener 628 is disposed through the center post 652. In some embodiments, the bottom of the cable guide 642 is disposed in a recess 629 formed in the support tray 609. In some embodiments, optional entry guides 643 are provided to guide the photonic connector 150 toward the cable guide 642. In one embodiment, the housing 610 is made from a metal such as aluminum or a polymeric material. The cap 613 may be made from a non-conductive material such as a rubber or other polymers.

Figure 19:
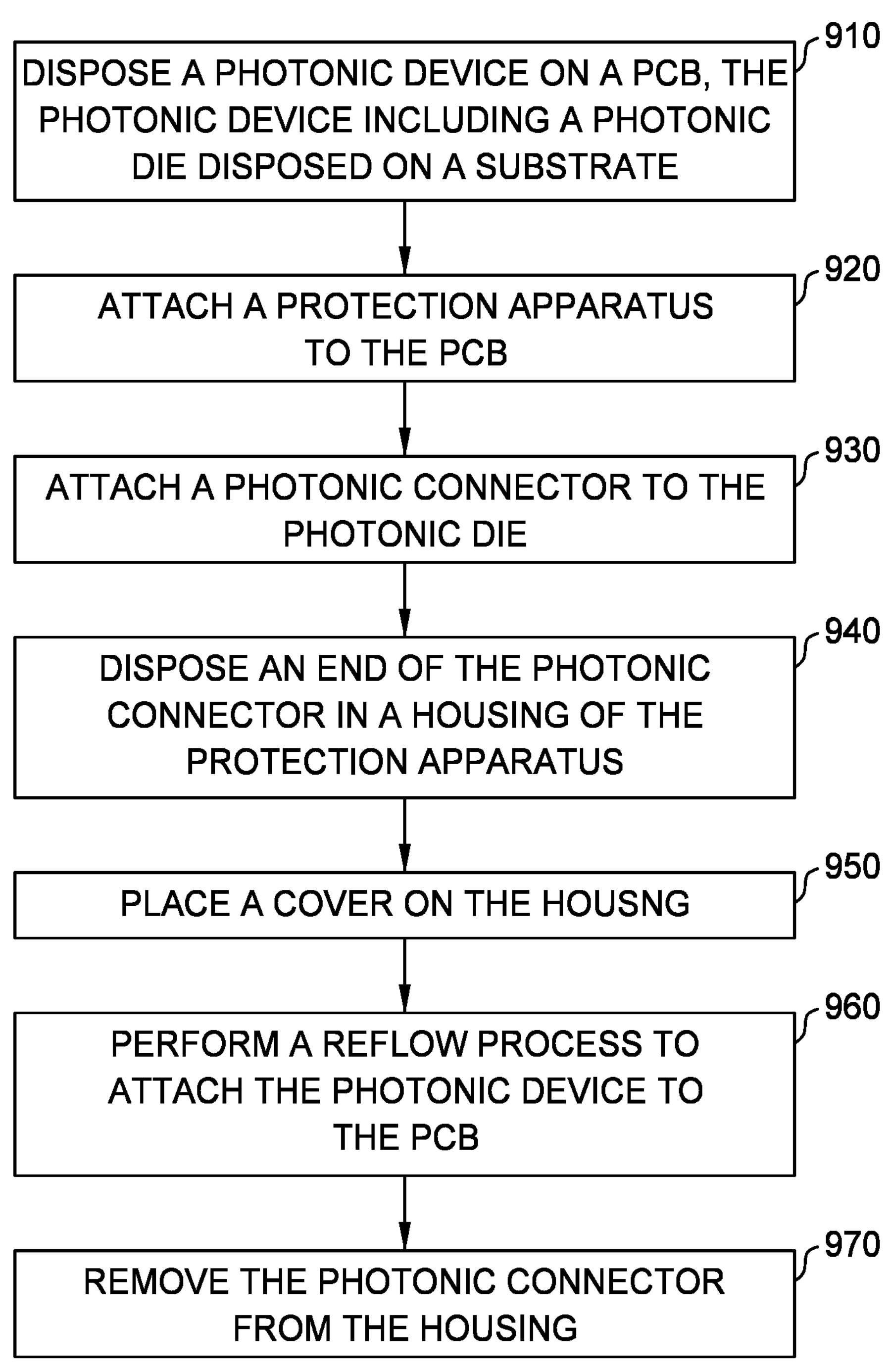
FIG. 19 illustrates a flow diagram of another exemplary process for fabricating an electronic device having a photonic die.

FIG. 19 illustrates a flow diagram of another exemplary process for fabricating an electronic device having a photonic die 110, according to some embodiments.

Figure 20:
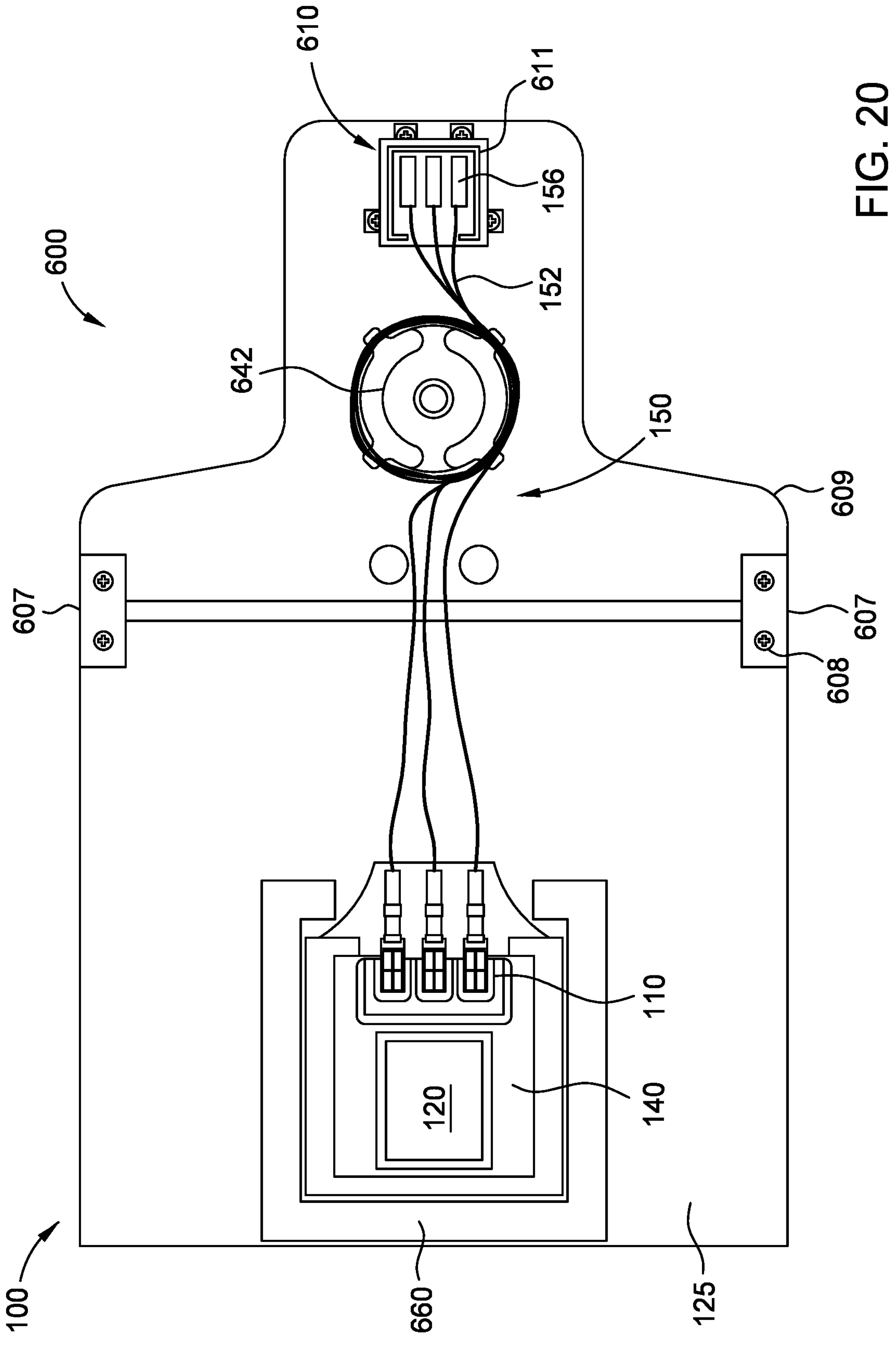
FIG. 20 illustrates a schematic view of the protection apparatus of FIG. 17 attached to the printed circuit board and a photonic connector disposed in a housing of the protection apparatus.

At operation 910, a photonic device 100 is disposed on a PCB 125. The photonic device 100 includes a photonic die 110 and an IC die 120 attached to a substrate 140. The photonic die 110 may be soldered to the substrate 140. One or more components may be attached to the PCB 125 prior to attaching the photonic device 100. For example, solder stencil may be printed on the PCB 125. In another example, a socket 660 is placed on the PCB 125 after the solder stencil is printed and before or after the photonic device 100 is placed on the PCB 125, as shown in FIG. 20.

At operation 920, a protection apparatus 600 is coupled to the PCB 125. For example, the linkages 607 are used to attach the protection apparatus 600 to the PCB 125.

At operation 930, a photonic connector 150 is connected to the photonic die 110 on the substrate 140. The photonic connector 150 may be attached using a v-groove array or other suitable receptacle. In the example depicted in FIG. 20, three photonic connectors 150 are attached to the photonic die 110.

At operation 940, the free (distal) end of photonic connectors 150 are disposed in the housing 610 of the protection apparatus 600 while their proximal ends remain attached to the photonic die 110. In one example, the fiber optic cables 152 of the photonic connectors 150 are routed through the cable guide 642, and the ferrule 156 at the distal end of the photonic connectors 150 is disposed inside the housing 610. Optionally, a length of the fiber optic cables 152 is wound around the cable guide 642. It is contemplated the ferrules 156 of the photonic connectors 150 may be disposed in the housing 610 prior to operation 920 or operation 930.

At operation 950, a cap 613 is placed on top of the walls 611 of housing 610 to prevent the ferrules 156 from falling out of the housing 610 and to prevent overheating of the ferrules 156 inside the housing 610.

At operation 960, a reflow process may be performed to attach the photonic device 100 to the PCB 125. In one example, the photonic device 100, the protection apparatus 600, and the PCB 125 are moved to a reflow chamber to perform the reflow process. For example, a suction tool 107 can be employed to move the photonic device 100, the protection apparatus 600, and the PCB 125 to a reflow processing chamber. Advantageously, use of the housing 610 may result in a higher fabrication yield due to the reduction in damaged fiber optic cables and connectors.

At operation 970, after reflow processing, the fiber optic cable 152 and the ferrule 156 of the photonic connector 150 are retrieved from the protection apparatus 600. The linkages 607 are disconnected and the protection apparatus 600 is removed from the PCB 125. The protection apparatus 600 can be reused for another fabrication process. Additionally, because the protection apparatus 600 is easily attached to the PCB 125, the cost impact of employing the protection apparatus 600 is minimal.

In one example, a method of fabricating a chip package is provided. The method includes connecting a photonic die to a substrate of the chip package and attaching a protection apparatus to the substrate. The method also includes attaching a photonic connector to the photonic die. At least a portion of the photonic connector is disposed inside a housing of the protection apparatus. A fabrication process is performed on the chip package while the photonic connector is inside the housing. After processing, the photonic connector is removed from the housing.

In some examples, attaching the protection apparatus to the substrate comprises attaching support posts of the protection apparatus to a stiffener; and attaching the stiffener to the substrate.

In some examples, the method includes removing the protection apparatus from the substrate after performing the fabrication processing.

In some examples, attaching the protection apparatus comprises attaching support posts to the substrate and coupling the housing to the support posts.

In some examples, the support posts are attached to threaded inserts in the substrate.

In some examples, the housing is coupled to the support posts using arms.

In some examples, the method includes disposing the photonic connector through an aperture of the housing.

In some examples, prior to attaching the photonic device, the method includes performing a reflow process to attach an electronic component on the substrate.

In some examples, prior to attaching the photonic device, the method includes performing a reflow process to attach an electronic component on the substrate.

In some examples, the method includes using the protection apparatus in a second fabrication process.

In some examples, a clearance exists between the housing and the photonic die.

In some examples, the photonic connector includes a fiber optic cable connected to a ferrule.

In some examples, the method includes disposing the photonic connector through an aperture of the housing.

In another example, an electronic assembly includes a chip package and a protection apparatus. The chip package includes a photonic die disposed on a substrate and a photonic connector attached to the photonic die. The protection apparatus includes a housing having a cavity and a plurality of support posts are attachable to the substrate. The housing is coupled to the support posts and at least a portion of the photonic connector is disposed in the cavity of the housing.

In some examples, the photonic connector extends through an aperture in the housing.

In some examples, the plurality of support posts are attached to threaded inserts in the substrate.

In some examples, the housing includes a first housing portion coupled to a second housing portion.

In some examples, the second housing portion includes a male connector extending into the cavity, and the first housing portion includes a receptacle for receiving the male connector.

In some examples, the chip package includes a stiffener. The plurality of support posts are attached to the stiffener, and the stiffener is attached to the substrate.

In some examples, the plurality of support posts include a channel for positioning the arm with respect to one of the plurality of support posts.

In some examples, the electronic assembly includes a fastener for attaching the arm to a respective support post.

In some examples, a method of fabricating an electronic device is provided. The method includes disposing a photonic device on a printed circuit board and coupling a protection apparatus to the printed circuit board. A photonic connector is attached to the photonic die, and at least a portion of the photonic connector is disposed inside a housing of the protection apparatus. A cover is placed on the housing to protect the photonic connector disposed therein. A fabrication process is performed to attach the photonic device to the printed circuit board. After the process, the photonic connector is removed from the housing.

While the foregoing is directed to embodiments of the present invention, other and further embodiments of the invention may be devised without departing from the basic scope thereof, and the scope thereof is determined by the claims that follow.

What is claimed is:

1. A method of fabricating an electronic device, the method comprising:

connecting a photonic die to a substrate;

temporarily attaching a removable protection apparatus to the substrate;

attaching a photonic connector to the photonic die;

disposing at least a portion of the photonic connector inside a housing of the protection apparatus, wherein disposing at least the portion of the photonic connector comprises disposing at least the portion of the photonic connector in a first housing portion coupled to a second housing portion;

performing a fabrication process with the photonic connector disposed at least partially inside the housing while the photonic connector is attached to the photonic die; and removing the photonic connector from the housing after completion of the fabrication process.

2. The method of claim 1, wherein the fabrication processing further comprises reflowing solder connections.

3. The method of claim 1, wherein attaching the protection apparatus to the substrate comprises:

attaching support posts of the protection apparatus to a stiffener; and attaching the stiffener to the substrate.

4. The method of claim 1, wherein attaching the protection apparatus comprises attaching support posts to the substrate and coupling the housing to the support posts.

5. The method of claim 4, wherein the support posts are attached to threaded inserts in the substrate.

6. The method of claim 4, wherein the housing is coupled to the support posts using arms.

7. The method of claim 1, wherein the substrate is a package substrate.

8. The method of claim 1, wherein the substrate is a printed circuit board.

9. The method of claim 8, wherein attaching the protection apparatus to the printed circuit board comprises:

gripping the housing by a pair of arms.

10. The method of claim 8, wherein coupling a protection apparatus to the printed circuit board comprises attaching a support tray of the protection apparatus adjacent to the printed circuit board.

11. The method of claim 1, further comprising routing the photonic connector around a cable guide.

12. An electronic assembly, comprising:

a chip package having:

a substrate;

a photonic die mounted to the substrate; and a photonic connector attached a first side of the photonic die;

a first protective housing mount disposed on the substrate on a first side of the photonic connector and a second protective housing mount disposed on the substrate on a side of the photonic connector opposite the first side, the first and second protective housing mounts configured to receive a removable protective housing for temporarily enclosing at least a portion of the photonic connector; and a stiffener attached to the substrate and surrounding the photonic die, the protective housing mounts integrated with the stiffener.

13. The electronic assembly of claim 12, wherein the protective housing mounts are threaded holes.

14. The electronic assembly of claim 12 further comprising:

support posts connected to the protective housing mounts, the support posts extending normally from the substrate.

15. The electronic assembly of claim 12, wherein a protection apparatus is coupled to the stiffener via the protective housing mounts, the protection apparatus comprising:

a protective housing having a cavity sized to receive at least the portion of the photonic connector; and a plurality of support posts attach to the protective housing mounts, the housing removably coupled to the support posts.

16. The assembly of claim 15, wherein the housing includes a first housing portion coupled to a second housing portion.

17. The assembly of claim 16, wherein the second housing portion includes a male connector extending into the cavity, and the first housing portion includes a receptacle for receiving the male connector.

18. The assembly of claim 15, further comprising an arm coupled between the housing and one of the support posts.

* * * * *